United States Patent [19]

Cavill et al.

[11] 4,304,497
[45] Dec. 8, 1981

[54] DETECTION OF MULTIPLE EMITTER CHANGES IN A PRINTER SUBSYSTEM

[75] Inventors: Barry R. Cavill, Boca Raton; Robert B. Steup, Pompano Beach, both of Fla.

[73] Assignee: International Business Machines Corporation, Armonk, N.Y.

[21] Appl. No.: 86,491

[22] Filed: Oct. 19, 1979

[51] Int. Cl.³ .................................... B41J 11/42
[52] U.S. Cl. ............................. 400/583; 364/900; 400/61; 400/616.1
[58] Field of Search .............. 400/61, 582, 583, 583.1, 400/583.4, 616–616.3; 364/111, 116, 518, 519, 200 MS File, 900 MS File

[56] References Cited

U.S. PATENT DOCUMENTS

| | | | |
|---|---|---|---|
| 3,777,128 | 12/1973 | Kirkham | 364/111 X |
| 4,109,311 | 8/1978 | Blum et al. | 364/200 |
| 4,146,922 | 3/1979 | Brown et al. | 364/519 X |
| 4,147,967 | 4/1979 | Aiena | 364/519 X |
| 4,153,945 | 5/1979 | Actor et al. | 364/900 |

Primary Examiner—Paul T. Sewell
Attorney, Agent, or Firm—D. Kendall Cooper

[57] ABSTRACT

A data processing system or printer subsystem is provided with facilities for detecting emitter changes that have occurred during operating intervals. In a typical operation, a microprocessor initiates a command to a moving assembly, such as a forms feed assembly, then once the operation is initiated the microprocessor transfers to other program responsibilities, meanwhile periodically checking the status of the forms feed assembly. The forms feed assembly supplies emitter signals to the processor which are utilized by the microprocessor to determine whether or not any emitter changes have occurred during the intervals between the checking operations. The microprocessor has a stored data table and logic responsive to emitter signal conditions that had previously occurred (WAS) and that is further responsive to emitter signals that are presently occurring (IS) to supply an output in numbers of emitters indicative of both the extent and direction of movement of the assembly during the intervening interval.

12 Claims, 26 Drawing Figures

COMMUNICATIONS MICROPROCESSOR (CMM)

CONTROL MICROPROCESSOR (CTM)

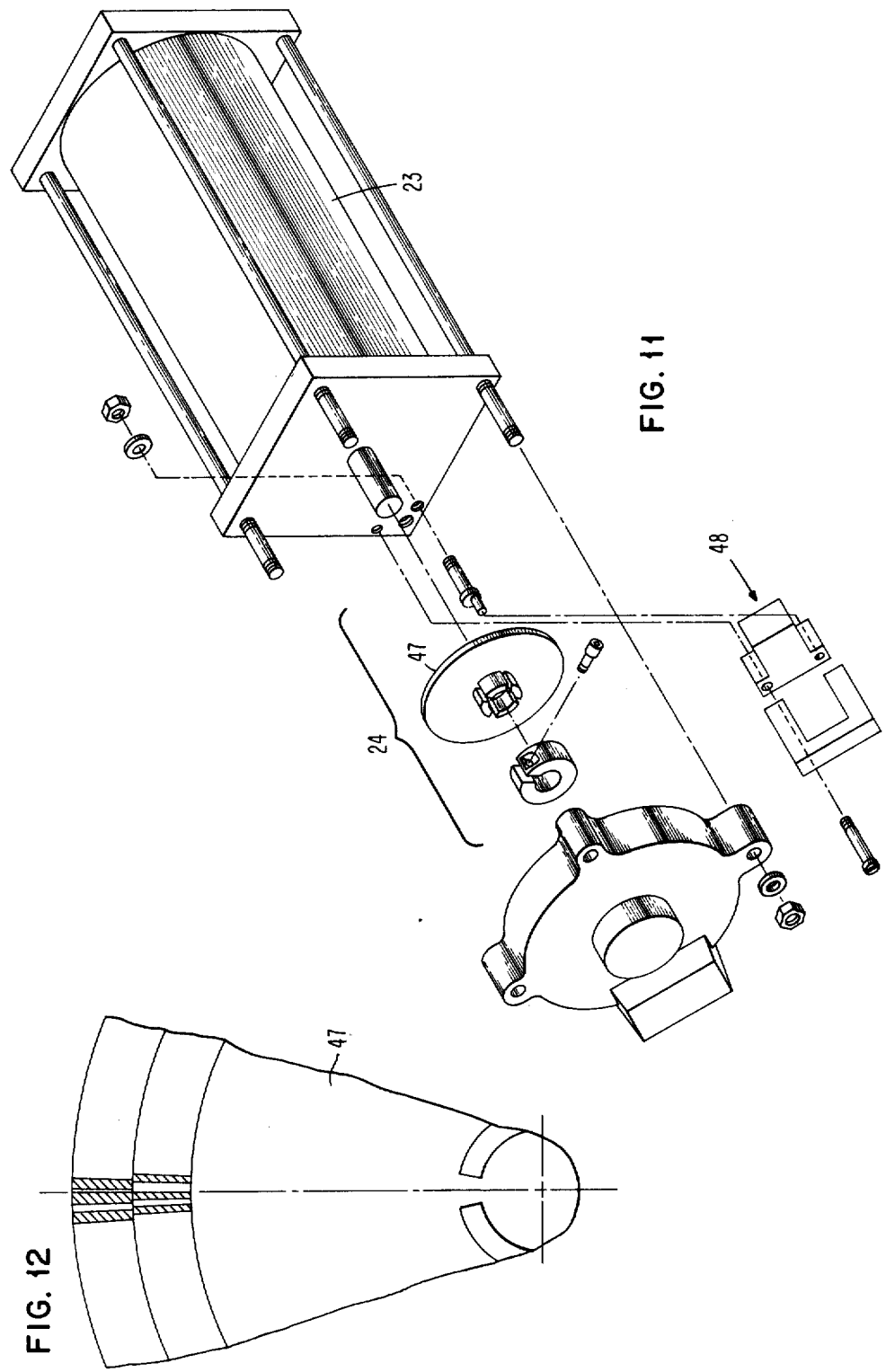

FORM "WAS/IS" TABLE

|  WAS \ IS | 10 | 11 | 01 | 00 |
|---|---|---|---|---|
| 10 | 0 | +1 | ±2 | -1 |
| 11 | -1 | 0 | +1 | ±2 |
| 01 | ±2 | -1 | 0 | +1 |
| 00 | +1 | ±2 | -1 | 0 |

FORMS CONTROL
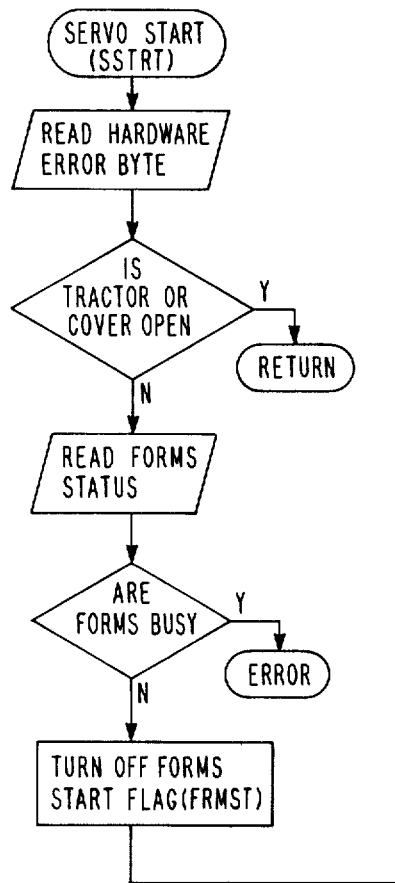
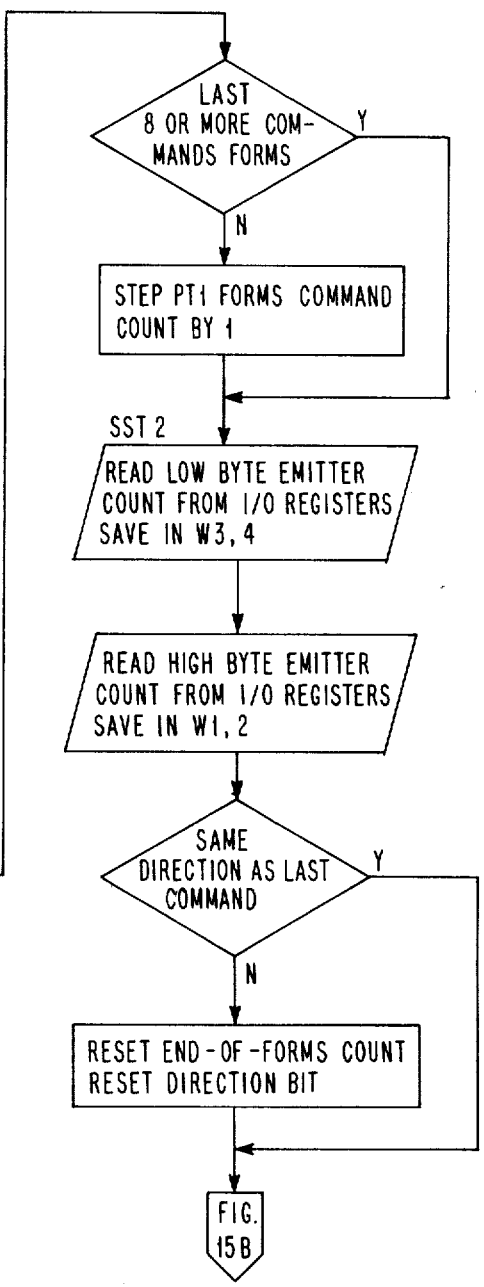
FIG. 15A

FIG. 16

REGISTER UTILIZATION

| | R0 | R1 | R2 | R3 | R4 | R5<br>PEMT | R6<br>PHF | R7<br>FLG1 |
|---|---|---|---|---|---|---|---|---|
| 8<br>4<br>2<br>1 | I/O &<br>WORK REGISTERS | | ←—— WORK REGISTERS ——→ | | | | PRCMP<br>PARK<br>DNSCH<br>FRMST | HIGST<br>TXBUF<br>RV<br>CD15 |

| | R8<br>FLG2 | R9<br>WIPOS | R10<br>FECT | R11<br>PRERR | R12<br>CMDFL | R13<br>EMCT1 | R14<br>EMCT2 | R15<br>EMCT3 |
|---|---|---|---|---|---|---|---|---|
| 8<br>4<br>2<br>1 | TOK<br>FMSTM<br>RBMON<br>FBFLG | | FE1<br>FE2<br>FDRCT<br>DIAGF | HHOME<br>TEDGE<br>HATNA | TSCMD<br>FMCMD<br>PRPND<br>PRCMD | ←—— PRINT EMITTER COUNTER ——→ | | |

| | D0 | D1 | D2 | D3<br>RM1 | D4<br>RM2 | D5<br>RM3 | D6<br>EOF1 | D7<br>FMCT1 |
|---|---|---|---|---|---|---|---|---|
| | ←—— MAIN / AUX ——→ | | | | | | | |
| 8<br>4<br>2<br>1 | ←—— ADDRESS REGISTERS ——→ | | | ←—— RIGHT MARGIN VALUES ——→ | | | LASTD<br>LBUSY<br>FBSEQ<br>EOFER | SIGN |

| | D8<br>FMCT2 | D9<br>FMCT3 | D10<br>FMCT4 | D11<br>ESTAT | D12 | D13<br>FLECT | D14<br>FMECT | D15<br>PT1 |
|---|---|---|---|---|---|---|---|---|
| 8<br>4<br>2<br>1 | ←—— FORMS EMITTER COUNTER ——→ | | | LASTE<br>LASTA<br>LASTB | | | | FLAST |

DETECTION OF MULTIPLE EMITTER CHANGES IN A PRINTER SUBSYSTEM

BACKGROUND OF THE INVENTION

This invention relates to data processing systems and printer subsystems but more particularly concerns the determination of the extent and direction of movement of movable devices therein, such as forms feed assemblies.

During operation of such systems or subsystems it is necessary that the Controller, such as a microcontroller, be able to keep accurate control of the movement of associated devices. As described, a microcontroller of this nature issues commands to the particular device to start movement in at least one direction and thereafter monitors by means of detection of signals from an emitter or similar timing device, not only the fact that movement has started but the extent of movement and its direction. It has been difficult for the microcontroller to accurately determine these factors and expensive hardware is necessary to perform this task.

SUMMARY OF THE INVENTION

In accordance with the present invention, a printer subsystem is provided with a microprocessor controller. The printer subsystem incorporates a forms feed assembly and an emitter to provide signals during movement of the forms feed assembly. The microcontroller issues controls to the forms feed assembly to start its movement in a particular desired direction, either in a forward direction or a reverse direction, with respect to a print line. As the forms feed assembly initiates motion and reaches its normal operating speed it provides a sequence of emitter pulses to the microcontroller. The microcontroller maintains in a storage element a record of previous emitter states and as movement proceeds, with the indication of the commanded direction of movement, compares the newly received emitter signals and their conditions to the stored emitter conditions, to determine which direction the forms have moved and how far they have moved.

CROSS-REFERENCE TO RELATED PATENT APPLICATION

The present patent application is one of a group of copending patent applications which concern the same overall printer subsystem configuration but which individually claim different inventive concepts embodied in such overall printer subsystem configuration. These related patent applications were filed on the same date, namely, Oct. 19, 1979, are specifically incorporated by reference herein. At least one of these applications of particular interest is more particularly described as follows:

(1) Application Ser. No. 086,484 entitled "Printer Subsystem with Microprocessor Control", the inventors being Messrs. William W. Boynton, et al;

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 11 is an enlarged view of the forms motor and forms emitter assembly shown in FIG. 4.

FIG. 12 is a somewhat enlarged portion of the emitter disc 47 shown in FIG. 11.

FIGS. 15A-15J represent a flow chart showing the initiation of a Forms Command, starting of the forms servo motor in proper direction and speed and adjustment procedures based on comparison of present and previous emitter states.

FIG. 16 illustrates storage assignment for internal registers in the control microprocessor shown in FIG. 7B.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host to print on the forms and in turn provides status signals to the host during operations.

The printer, itself is an output line printer designed to satisfy a variety of printing requirements in data processing, data collection, data entry, and communications systems. It can be used as a system printer or a remote work station printer. The following printer highlights are of interest:

Print density of 10 or 15 characters per inch (25.4 mm) selectable by the operator or by the using system program;

Condensed print mode, 15 characters per inch (25.4 mm), saves paper costs and makes report handling, mailing, reproduction, and storage easier;

Line spacing of 6 to 8 lines per inch (25.4 mm) selectable by the operator or any other line density by the using system program;

Incremental and reverse forms movement selectable by the using system program;

Sixteen self-contained character sets selectable by the using system program with a base language selected by hardware jumpers.

Special graphics ability (special characters, graphs, plotting, etc.) selectable by the using system program;

Matrix printing technology;

Built-in diagnostics for problem determination by the operator;

Microprocessor control unit;

Maximum print line width—330.2 mm (13.2 in);

Maximum print positions for 10 characters per inch (25.4 mm)—132;

Maximum print positions for 15 characters per inch (25.4 mm)—198;

Adjustable forms width—76.2 to 450 mm (3.0 to 17.7 in);

Maximum forms length—76.2 to 317.5 mm (3.0 to 12.5 in).

Figure 1:
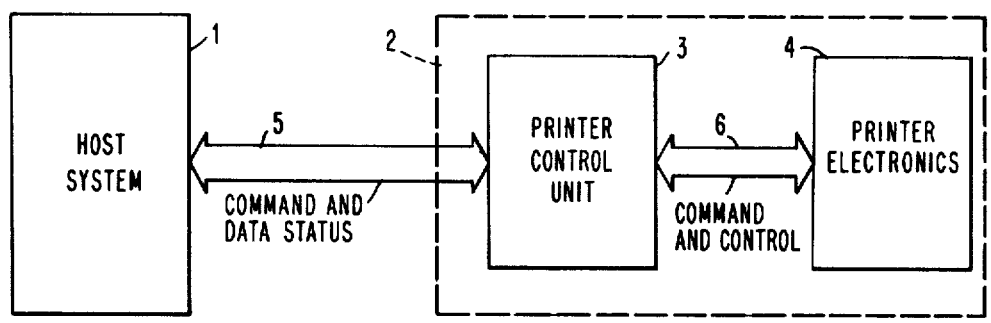
FIG. 1 is a simplified system diagram for the printer subsystem.

FIG. 1 illustrates a representative system configuration including a host system 1 and the printer subsystem 2 which includes a printer control unit 3 and printer electronics 4. Command and data signals are provided by the host system by way of interface 5, and command and control signals are provided from printer control unit 3 to the printer electronics 4 by way of interface 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier, the operator panel, and the printer sensors.

The elements of the system, such as the printer control unit and printer electronics, incorporate one or more microprocessors or microcomputers to analyze commands and data and to control operations.

Figure 2:
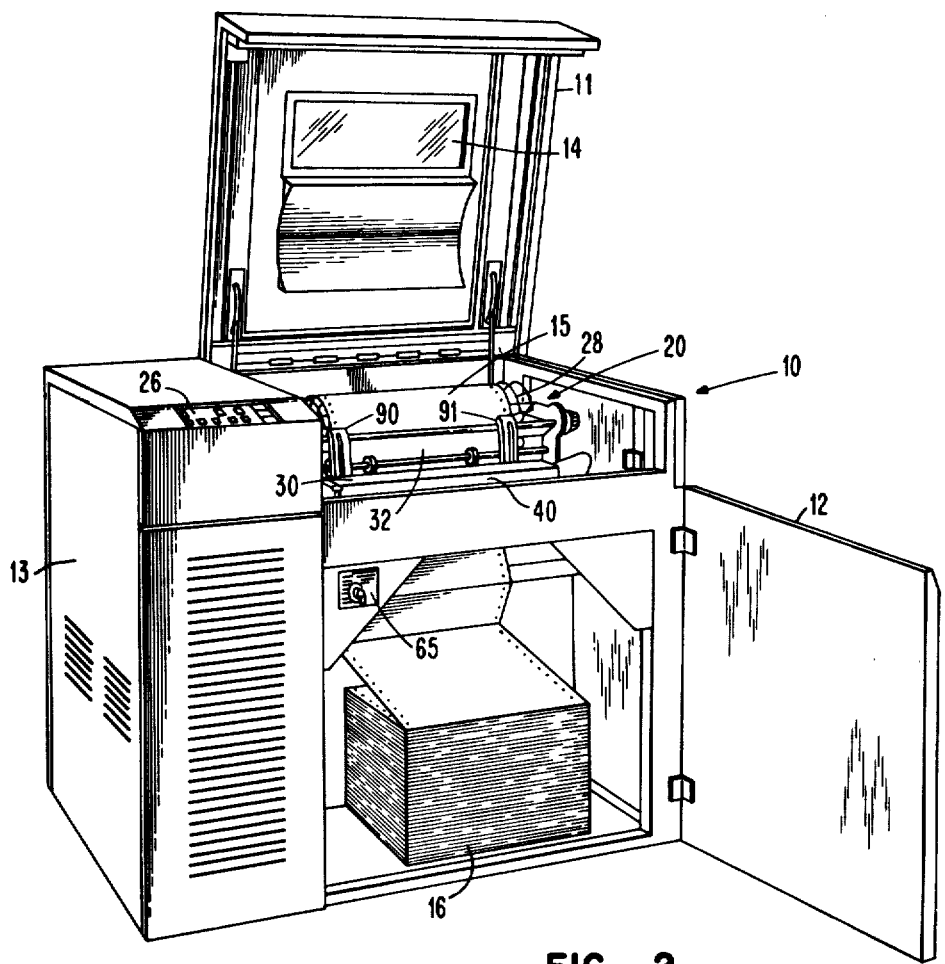
FIG. 2 illustrates the printer console and a number of printer components as well as forms feeding.
Figure 3:
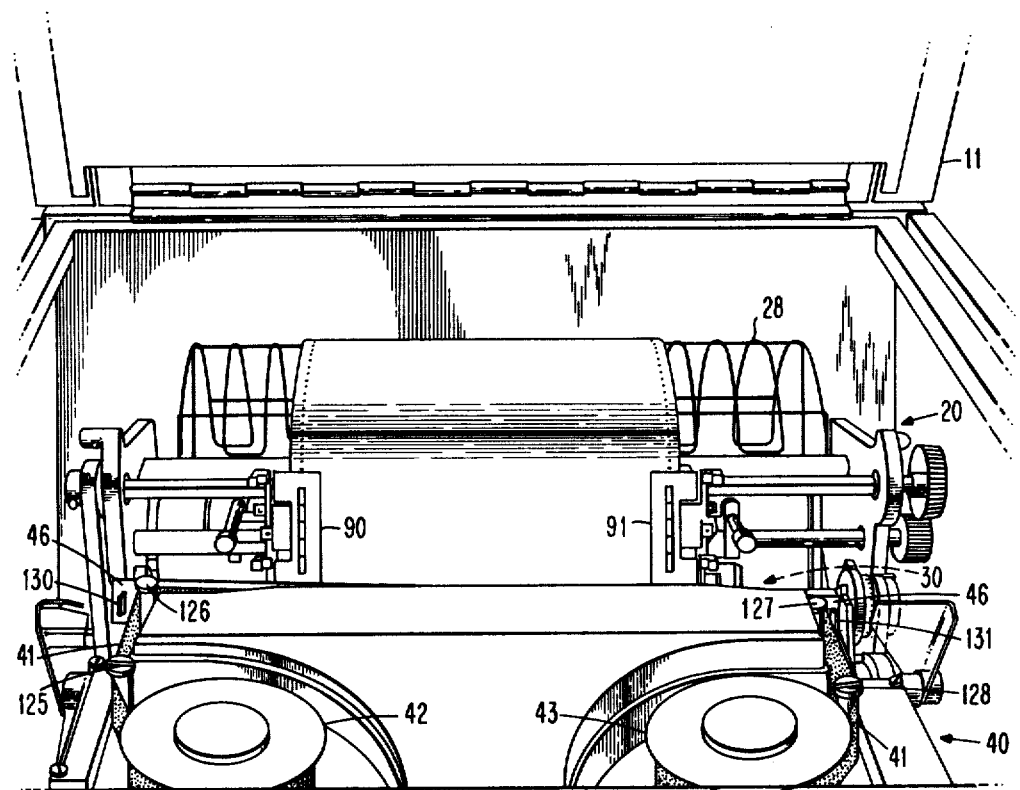
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover is closed. Forms 15 (documents) are provided from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms after printing to a takeup stack, not shown but positioned below the printing mechanism and to the rear of the printer console. The printer incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize ink smudging on forms 15. Two motors shown more clearly in FIG. 4 drive ribbon 41 back and forth between spools 42 and 43. The printer control unit detects ribbon jams and end of ribbon (EOR) conditions. A ribbon jam turns on an error indicator and stops printing. An EOR condition reverses the ribbon drive direction.

The printer includes an operator panel 26 that consists of several operator control keys, two indicator lights, a power on/off switch, and an operator panel display. By using various combinations of the keys in conjunction with the shift key, the operator can: start or stop printing and view the last line printed, set print density, position the forms up or down on page or one line at a time, move the forms incrementally up or down for fine adjustment, and start or stop the diagnostic tests when selected by a mode switch, to be described.

The indicator lights on the operator panel display notify the operator that: the printer is ready to print data from the using system, the printer requires attention, the current print density setting, errors, if any, have been detected, and the results of the diagnostic tests.

A 16-position mode switch 65 is located behind the front door 12. An on-line position permits printing to be controlled by the using system. All other positions are off-line and do not allow printing to be initiated from the using system.

OVERVIEW OF PRINTER MECHANISMS

Figure 4:
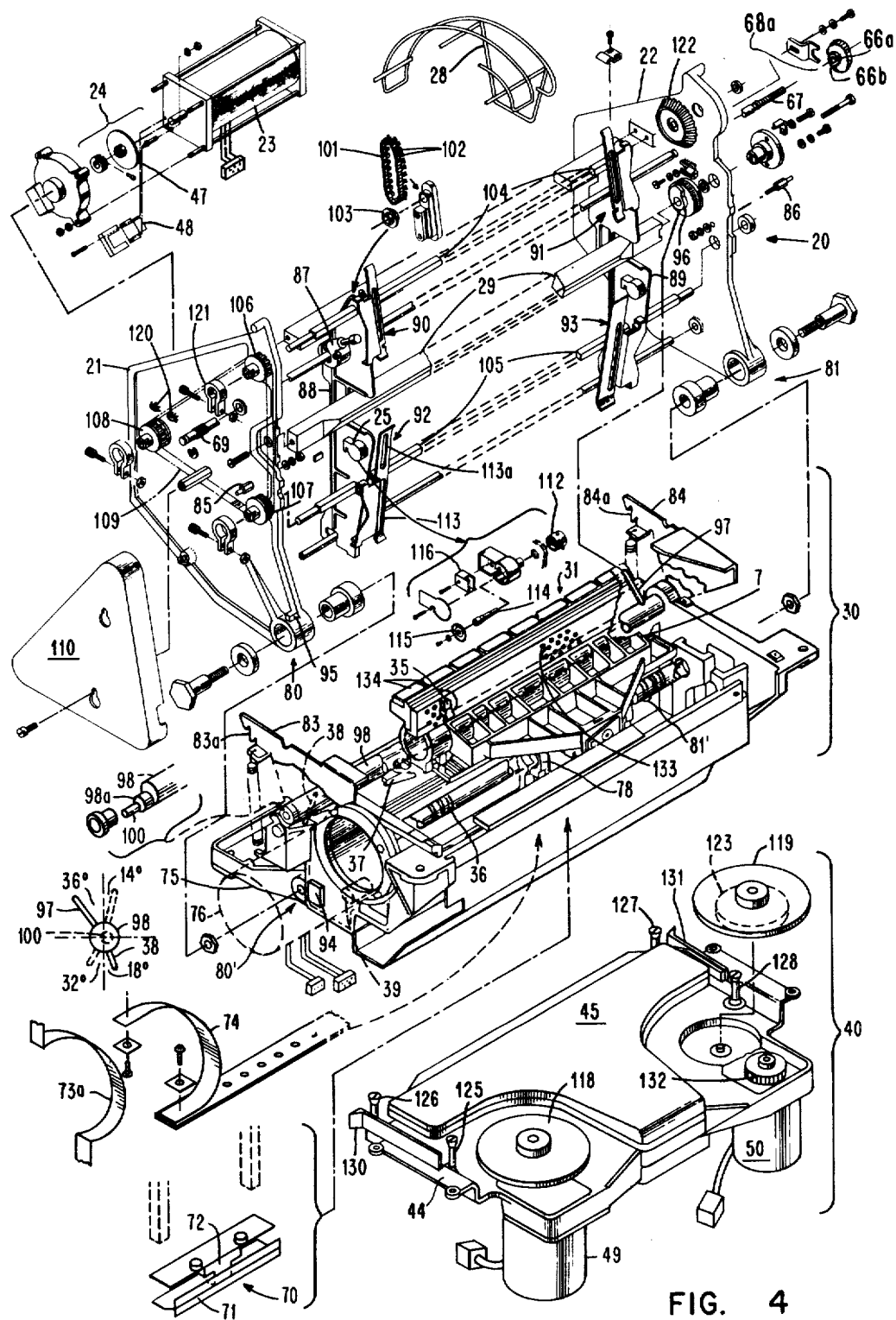
FIG. 4 is an exploded view of various printer assemblies including the forms feed assembly, the print assembly and the ribbon drive assembly.

FIG. 4 in particular shows the details of construction of the forms feed assembly 20; the print assembly 30, the ribbon drive assembly 40, and various associated emitters. A general overview of these assemblies is first presented.

As best seen in FIG. 4 forms feed assembly 20 has end plates (side castings) 21 and 22 which support the various forms feed mechanisms including a drive motor 23 to drive tractors 90-93, the motor having a forms feed emitter assembly 24. The forms feed assembly has a separate end of forms and jam detector emitter 25. Assembly 20 also includes a platen 29 located behind the forms and against which the print wires 33 are actuated during printing.

The print assembly 30 includes a base casting 75 supporting various mechanisms including print motor 76, shown in phantom in FIG. 4 in order that other elements may be seen more easily, and connected to drive a print head carrier 31 with actuator block assembly 77 in a reciprocal fashion horizontally to effect printing on an inserted form. The print assembly also drives the print emitter assembly 70 having emitter glass 71 and optical sensor assembly 72.

The ribbon drive assembly 40 includes a support casting 44, a cover 45, and drive motors 49 and 50.

FORMS FEED ASSEMBLY

In order to load paper in the printer the forms feed assembly 20 pivots away from the base casting 75 at pivot points 80 (80') and 81 (81'), to allow access to thread the forms into position. Latches 83 and 84 are raised by the operator so that extremities 83a and 84a disengage eccentric pins 85 and 86 on the forms feed assembly 20. The forms feed assembly 20 then pivots away from the operator as viewed in FIG. 4. This allows access to tractors 90-93 so that the operator may load paper. The forms feed assembly is then reclosed and relatched by latches 83 and 84 for normal machine operation. During the time that the forms feed assembly is pivoted back for service, a switch 94 prevents machine operation. This switch is actuated by a tang 95 on forms feed assembly 20 when it is closed.

Referring to FIG. 4, the forms feed assembly includes means for adjusting for forms thickness. As mentioned, the entire forms feed assembly pivots back from the rest of the printer about pivot points 80 and 81. In the closed position the forms feed assembly is in such a position that a spiral cam and knob assembly 96 engages a pin 97 on the main carrier shaft 98 of the print assembly 30. Adjustment of the spiral cam and knob assembly 96 is such that it rotates the main carrier shaft 98. Assembly 96 is retained in position by a spring loaded detent assembly. This has a spring loaded pin which engages notches in the knob so that it is held in the position set by the operator. Associated with shaft 98 are eccentrics such as portion 98a on the left end of shaft 99 with tenon 100 onto which latch 83 is mounted. Rotation of shaft 98 thus moves latches 83 and 84 which changes the distance between assemblies 20 and 30 and thus the distance between the ends of print wires 33 and platen 29. This adjustment enables the printer to accommodate forms of various thicknesses. The printer can handle forms from one part to six parts thickness.

The paper feeding is accomplished by the four sets of tractors 90-93 two above the print line and two below the print line. The individual tractors include drive chains to which pins are attached at the proper distance to engage the holes in the form. As an example, tractor 90 has drive chain 101 with pins 102. Chain 101 is driven by a sprocket 103 attached to a shaft 104 which also drives the sprocket and chains for tractor 91. Tractors 92 and 93 are driven from shaft 105. Because the tractors are above and below the print line, the printer is able to move the paper in either direction. The normal direction of forms drive is upwardly in FIG. 4. However, it is possible to move the paper downwardly, as well.

Rotation of shafts 104 and 105 and forms feeding is accomplished by appropriate drive of motor 23 in the proper direction which in turn drives pulleys 106 and 107 (to which shafts 104 and 105 are connected) from motor pulley 108 by means of drive-timing belt 109. Cover 110 covers belt 109 and pulleys 106-108 during rotation. The forms feed emitter assembly 24 includes an emitter wheel 47 with marks to indicate rotation and a light emitting diode assembly 48 that serve to indicate extent of rotation of motor 23 in either direction and as a consequence, the extent of movement of the forms as they are driven by motor 23.

The capability of the printer to feed paper in both directions offers some advantages. For example, in order to improve print visibility at the time the Stop button is pushed by the operator, the paper may be moved up one or two inches above where it normally resides so that it can be easily read and can be easily adjusted for registration. When the Start key is depressed, the paper is returned to its normal printing position back out of view of the operator. The printer may also be used in those applications where plotting is a requirement. In this case a plot may be generated by calculating one point at a time and moving the paper up and down much like a plotter rather than calculating the entire curve and printing it out from top to bottom in a raster mode.

End of forms and jam detection is accomplished by assembly 25 having a sprocket 112 just above the lower left tractor. The teeth in this sprocket protrude through a slot 113a in the flip cover 113. This sprocket is not driven by any mechanism but simply is supported by a bearing that is part of assembly 25. The sprocket engages the feed holes in the paper as it is pulled past by the tractor assemblies. On the other end of the shaft 114 from the sprocket is a small optical emitter disc 115. The marks in this disc are sensed by an LED phototransistor assembly 116 and supplied to the electronics of the subsystem. The electronics verifies that marks have passed the phototransistor assembly 116 at some preselected frequency when the paper is being fed. If the mark is not sensed during that time, the machine is shut down as either the end of forms has occurred or a paper jam has occurred.

The castings 88 and 89 supporting the tractors 90-93 are adjustable left or right in a coarse adjustment in order to adjust for the paper size used in a particular application. After they are properly positioned they are locked in place on shaft 67 by locking screws such as locking screw 87.

All tractors are driven by the two shafts 104 and 105 from motor 23 as previously described. The motor adjusts in the side casting 21 in slots 120 in order to provide the correct tension for belt 109.

Besides the coarse adjustment, there is also a fine adjustment which is used to finally position in very small increments laterally the location of the printing on the forms. This is done by a threaded knob 66 which engages shaft 67 to which both tractor castings clamp. This shaft floats between side castings 21 and 22 laterally. The threads in knob 66 engage threads on the right end of shaft 67. The knob is held in a solid position by fork 68 the portion 68a engaging notch 66a formed by the flanged portion 66b of knob 66. Therefore knob 66 stays stationary and the threads driving through the shaft force shaft 67 laterally left or right, depending upon the direction in which knob 66 is rotated. Shaft 67 is always biased in one direction to take out play by a spring 69 on the left end of shaft. As the paper leaves the top of the tractors, it is guided up and toward the back of the machine and down by the wire guide 28.

In order to insure that the distance between the pins in the upper tractors is in correct relationship to the pins in the lower tractors an adjustment is performed. This adjustment is made by inserting a gauge or piece of paper in the tractor assembly which locates the bottom pins in the correct relationship to the top pins. This is done by loosening a clamp 121 on the end of shaft 104. Once this position is obtained, then clamp 121 is tightened and in effect phases the top set of tractors to the bottom set so that holes in the paper will engage both sets of tractors correctly. Forms may be moved through the tractor forms feed mechanism manually by rotating knob 122. This knob simply engages the top drive shaft 104 of the upper tractor set and through the timing belt 109 provides rotational action to the lower tractor set, as well.

PRINT ASSEMBLY

Figures 13, 14:
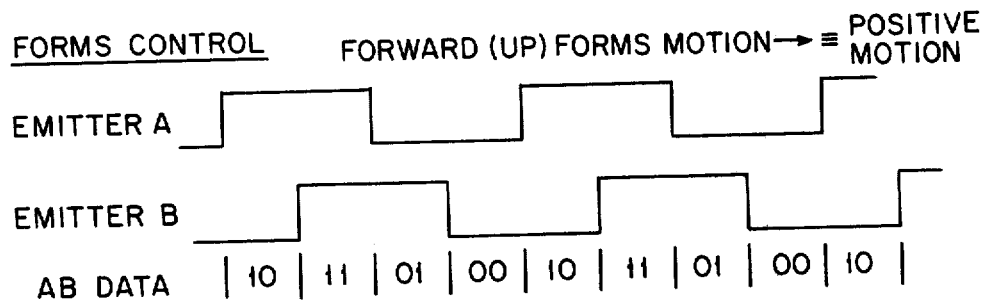
FIG. 13 illustrates emitter waveforms developed during forms movement by the forms emitter assembly in FIGS. 4, 11, and 12.
FIG. 14 represents a stored table used for determination of emitter changes during operations of the printer forms feed assembly.

In FIG. 4, print assembly 30 comprising a carrier 31, actuator block assembly 7 and support 78 accomodates all the print heads with their wire actuators 35 and print wires 33. Actuator block 77 is designed to hold from two up to eight or nine print head groups of eight actuators each. Thus, a printer with eight print head groups, as shown in FIGS. 8 and 13, has sixty-four print wire actuators and sixty-four associated print wires 33. Only two actuators 35 are shown positioned in place in FIG. 4. The other sixty-two actuators would be located in apertures 133 only a few of which are depicted. To insure long life of the print wires, lubricating assemblies 134 containing oil wicks are positioned in proximity to the print wires. The print wire actuators fire the wires to print dots to form characters. Carrier 31 is shuttled back and forth by a lead screw 36 driven by motor 76. Lead screw 36 drives the carrier back and forth through nuts which are attached to the carrier. When carrier 31 is located at the extreme left, as viewed in FIG. 8, this is called the "home position". When the carrier is moved to the home position, a cam 37 attached to the carrier engages a pin 38, the pin being attached to the main carrier shaft 98. If the machine has not been printing for some period of time, in the neighborhood of a few seconds, the printer control unit signals the carrier to move all the way to the left, in which case cam 37 engages pin 38 to rotate the main carrier shaft 98 approximately 15 degrees. On each end of the shaft are the eccentrically located tenons, such as tenon 100, previously described. These tenons engage the latches 83 and 84 so that the distance between the print assembly and the forms feed assembly is controlled by the latches. As shaft 98 rotates, the eccentrics associated with latches 83 and 84 separate the forms feed assembly from the print assembly.

The purpose of motor 76, of course, is to move the carrier 31 back and forth in order to put the print actuators 35 and print wires 33 in the proper positions to print dots and form characters. Since the motion is back and forth, it requires a lot of energy to get the mass of carrier 31 and actuators 35 stopped and turned around at the end of each print line. A brushless DC motor is used. The commutation to the windings in the motor is done external to the motor through signals sent out of the motor via a Hall effect device emitter 39. In other words, the emitter 39 within the motor sends a signal out telling the printer control unit that it is now time to change from one motor winding to the next. Therefore, there are no rubbing parts or sliding parts within the motor, and switching is done externally via electronics based on the signals that the motor sends out from its emitter. The motor draws about 20 amperes during turnaround time and, because of the high current it draws and because of the torque constant required from the motor, it is built with rare earth magnets of Semarium cobalt which provide double the flux density of other types of magnets.

Semarium cobalt is not just used because of the higher flux density but also because its demagnetization occurrence is much higher and, therefore, more current can be sent through the motor without demagnetizing the internal magnets. During printing, carrier 31 that holds the print actuators 35 goes at a velocity of approximately 25 inches per second. The turnaround cycle at the end of the print line requires 28 milliseconds approximately, resulting in a Gravity or "G" load in the neighborhood of 4 G's. The carrier, with all the actuators mounted, weighs about eight and a half pounds.

The current necessary to fire the print actuators is carried to the actuators via cable assemblies, one for each group of eight actuators. The cabling, such as cable 73a, FIG. 4, is set in the machine in a semicircular loop so that as carrier 31 reciprocates it allows the cable to roll about a radius and therefore not put excessive stress on the cable wires. This loop in the cable is formed and held in shape by a steel backing strap 74. In this case there is one cable assembly for each group of eight actuators or a maximum of eight cable backing strap groups.

RIBBON DRIVE ASSEMBLY

The ribbon drive assembly 40 for the printer is also shown in FIG. 4. Spools 42 and 43 are shown with spool flanges but may be structured without spool flanges and contain the ribbon. The spools can be seen on either side of the machine near the front, FIG. 3 and are respectively driven by stepper motors 49 and 50. These spools typically contain 150 yards of standard nylon ribbon that is one and a half inches wide. Gear flanges 118 and 119, FIG. 4, support ribbon spools 42 and 43, respectively. Drive for spool 43, as an example, is from motor 50, pinion gear 132 to a matching gear 123 formed on the underneath side of gear flange 119 then to spool 43. In one direction of feed, the ribbon path is from the left-hand spool 42 past posts 125 and 126, FIGS. 3 and 8, across the front of the ribbon drive assembly between the print heads 34 and forms 15, then past posts 127 and 128 back to the right-hand ribbon spool 43. A ribbon shield 46, not shown, is generally located between posts 126 and 127 and is mounted on the two attachment spring members 130 and 131.

ALTERNATIVE FORMS FEED ASSEMBLY

Figure 5:
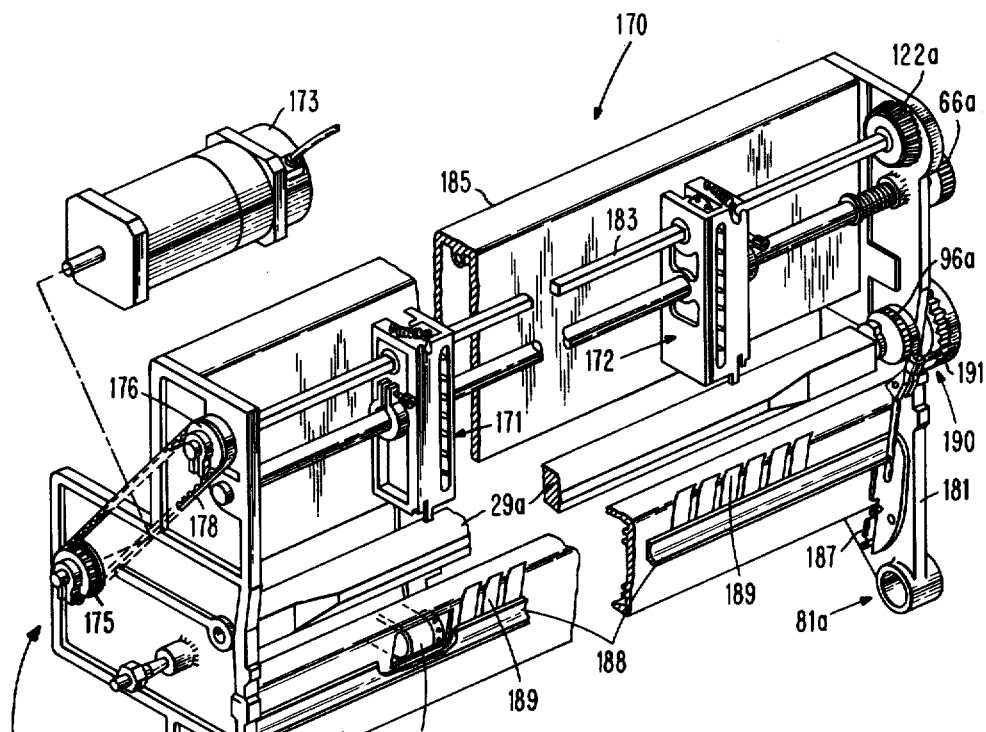
FIGS. 5 and 6 illustrate an alternative forms feed assembly for the printer unit.
Figure 6:
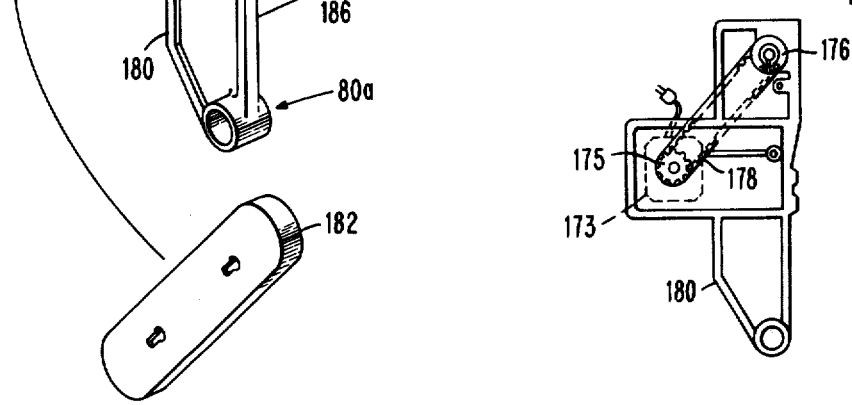

FIGS. 5 and 6 illustrate an alternative single direction forms feed assembly 170 which feeds forms only in the upward direction as viewed in these figures. In contrast with the forms feed assembly previously described in conjunction with FIG. 4, this forms feed assembly has only a single upper set of tractors 171 and 172. A driving motor 173 provides driving force through gears 175 and 176 by way of timing belt 178. The various elements comprising the forms feed assembly are supported in a left end plate 180 and a right end plate 181. FIG. 6 is a left end elevation of the forms feed assembly 170 illustrating the positional relationships of motor 173, timing belt 178 and other elements. A cover plate 182 covers timing belt 178 during operations. Driving of the pin feeds on the two tractors 171 and 172 is analogous to the driving of the pin feeds for forms feed assembly 20 illustrated in FIG. 4 and previously described. In forms feed assembly 170, the tractor drive includes a drive shaft 183.

Lateral support for the forms feed assembly 170 is provided by an upper support 185 and a lower support 186. The assembly also includes a platen member 29a. Other elements such as knobs 122a, 66a, and 96a are analogous to their counterpart elements 122, 66, and 96 shown in FIG. 4. The tractor mounts to the printer base casting 75 in FIG. 4 at pivot points 80a and 81a.

In place of the two lower tractors 92 and 93 in FIG. 4, this forms feed assembly includes a pressure drag assembly 188 with compliant fingers 189. These fingers exert physical pressure against the paper when in position against platen 29a and in the immediate vicinity of the printing station.

At the same time that forms feed assembly 170 is opened for insertion of new forms, the drag assembly 188 is also opened, but while the forms feed assembly moves toward the rear of the printer, the drag assembly moves toward the front. Spring element 187 enables drag assembly 188 to adjust to allow the forms to slide through when loading the forms. One additional cam element 190 cooperates with a follower 191 to provide adjustment of the pressure exerted by the drag assembly 188 on the paper for the purpose of accommodating various thicknesses of forms.

The assembly includes an End of Forms sprocket assembly 192 that could also serve to detect paper jams and that works in an analogous fashion to assembly 25 with sprocket 112 shown in FIG. 4.

PRINTING OF CHARACTERS, RELATIONSHIPS OF PRINT WIRES, CHARACTER LOCATIONS AND EMITTERS

Characters that are printed are formed by printing dots on the paper. These dots are printed by wires that are mounted in groups of eight on a carrier bar that moves back and forth adjacent to the print line. Printing is bidirectional with complete lines of print formed right-to-left and left-to-right. Reference is made to the William W. Boynton et al patent application previously listed in the cross-reference section.

A character is formed in a space that is eight dots high by nine dots wide. Two of the nine horizontal dot columns (1 and 9) are for spacing between characters. Any one wire can print a dot in four of the seven remaining horizontal dot positions (2 through 8). The printer can print 10 characters per inch or 15 characters per inch.

Most of the characters printed use the top seven wires in the group to print a character in a format (or matrix) that is seven dots high and seven dots wide. The eighth (bottom) wire is used for certain lower case characters, special characters, and underlining.

The number of print wire groups varies according to the printer model, and typically can be 2, 4, 6 or 8 groups. Printing speed increases with each additional wire group.

INFORMATION CODES

All 256 8-bit codes of the Extended Binary Coded Decimal Interchange Code (EBCDIC) are recognized by the printer control unit. In a data stream hexadecimal codes of 00 through 3F represent formatting commands, 40 through FE represent data (FF is always a blank character).

These codes may be used to represent all characters.

OPERATIONAL COMMANDS

Operational commands, listed in Table I below, determine the printer function to be performed, such as Write Data, Read Status, etc. Some operational commands require an additional command or data frame. In these cases, the next frame transmitted must contain that command or data frame. Operational commands are embedded in the data stream wherever required for proper control of the printer. The Hex Code is bits 7 through 14 of a data frame.

OPERATIONAL COMMAND SEQUENCE

A representative sequence of events between a controlling unit and the printer subsystem to effect printing of data is described in the previously referred to William W. Boynton et al patent application.

TABLE I

| OPERATIONAL COMMAND SUMMARY | | |
|---|---|---|
| Command Name | Hex Code | Function |
| Poll | X0 | Poll causes a one-frame status response from the printer until a Set Mode command is issued; thereafter, Poll initiates a two-frame status response. Bit 8 set to 1 resets line parity error indication. Bit 9 notifies the printer to send current status frames. |
| Read Device ID | 0C | Initiates the transfer of the ID (Identifier) frame from the printer to the controlling device. Must be followed by an Activate Read command. |
| Read Status | 88 | Initiates the transfer of one frame of outstanding status from the printer. Must be followed by an Activate Read Command. |
| Activate Read | 00 | Required to complete Read Device ID or Read Status operations. This command signals the hardware that data is to start a transfer and is not placed in the command queue. |
| Write Data | 1E | Causes the printer to store all data frames after the Activate Write. |
| Activate Write | 01 | Causes printing of data frames that follow this command. This command signals the hardware that data is to start a transfer. This is not placed in the command queue. |
| Write Control Data | 05 | Resets exception or outstanding status. |
| Set Mode | 13 | Must be issued before the printer accepts any other command except Poll and Reset. Followed by a data frame that defines the interval between frames. |
| Reset | 02 | Resets printer to a power-on reset condition. |
| Clear | 12 | Clears all print data buffers. |
| End-of-Queue (EOQ) | 62 | Marks end of command queue loading. |

FORMATTING COMMANDS

FORMATTING COMMAND FUNCTION

Formatting commands, shown in Table II below, control forms movement and line length. They are embedded in the information stream that follows the Write Data command.

Some formatting commands require more than one frame. A code in the first frame identifies multiple frame commands. In some cases the code in the second or third frame further defines the total number of frames to be used. The formatting command codes are also referred to as "standard character string" (SCS) codes. SCS is an SNA control-character subset.

TABLE II

| Command Name and Abbreviation | FORMATTING COMMAND SUMMARY Frame Sequence (Hex Code/Parameter) | | | | | | Description |
|---|---|---|---|---|---|---|---|
| | 1 | 2 | 3 | 4 | 5 | 6 | |
| Null (NUL) | 00 | | | | | | No Operation |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| | | | | | | | performed. |
| Carriage Return | 0D | | | | | | Moves the print position to the first position of the current line. |
| New Line | 15 | | | | | | Moves the print position to the first position of the next line. |
| Interchange Record Separator (IRS) | 1E | | | | | | Same as New Line. |
| Line Feed (LF) | 25 | | | | | | Moves the print position to the same horizontal position of the next line. |
| Form Feed (FF) | 0C | | | | | | Moves the print position to the first position of the next page. |
| Bell (BEL) | 2F | | | | | | Turns off Ready, turns on Attention and the audible alarm and stops printing. |
| Absolute Horizontal Position (AH) | 34 | C0 | NN | | | | Moves the print position to the horizontal position specified in the parameter frame. The parameter frame NN immediately follows the AH command. |
| Absolute Vertical Position (AV) | 34 | C4 | NN | | | | Moves the print position specified in the parameter frame. The parameter frame NN immediately follows the AV command. |
| Relative Horizontal Print Position (RH) | 34 | C8 | NN | | | | Moves the print position horizontally towards the end of the line from the current print position the number of columns specified in the parameter frame. The parameter frame NN immediately follows the RH command frame. |
| Relative Vertical Print Position (RV) | 34 | 4C | NN | | | | Moves the print position vertically towards the bottom of the page from the current print position the number of lines specified in the parameter frame. The parameter frame NN immediately follows the RV command frame. |
| Set Horizontal Format (SHF) | 2B | C1 | NN | HH | | | Sets the print line length to the value speci- |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| | | | | | | | fied in the parameter frames. The parameter frames NN and HH immediately follow the C1 command frame. |
| Set Vertical Format (SVF) | 2B | C2 | NN | VV | | | Sets the page length to the value specified in the parameter frames. The parameter frames NN and VV immediately follow the C2 command frame. |
| Set Graphic Error Action (SGEA) | 2B | C8 | NN | GG | UU | | Sets the unprintable character option and defines the default graphic that is specified in the parameter frames. The parameter frames NN, GG, and UU immediately follow the C8 command frame. |
| Transparent (TRN) | 35 | NN | | | | | Permits the codes normally used as control characters to be used as printable characters. The parameter frame NN specifies the number of frames that follows the 35 command frame. |
| Subscript (SBS) Not available for single direction paper feed. | 38 | | | | | | Line feeds 1.41 mm (4/72 in) to print subscript characters. |
| Superscript (SBS) Not available for single direction paper feed. | 09 | | | | | | Reverse line feeds down 1.41 mm (4/72 in.) to print superscript characters. |
| Set Character Distance (SCD) | 2B | D2 | 04 | 29 | P1 | P2 | Sets the character density to 10 or 15 cpi as specified in the P1 and P2 parameter frames. |
| Set Baseline Increment (SBI) Not available for single direction paper feed. | 2B | D2 | 04 | 15 | P1 | P2 | Sets the depth of one line of print to .176 mm (1/144 in.). |
| Set CGCS through Local ID (SCL) CGCS - Coded Graphic Character Set | 2B | D1 | 03 | 81 | P1 | | Loads 1 of 16 graphic character sets specified in the P1 parameter frame. |
| Absolute Move Baseline (AMB) Not available for single direction | 2B | D3 | 04 | D2 | P1 | P2 | Moves the print position forward in the vertical direction from the current print position |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| paper feed | | | | | | | to the new print position specified in the P1 and P2 parameter frames. |
| Relative Move Baseline (RMB) Not available for single direction paper feed. | 2B | D3 | 04 | D4 | P1 | P2 | Moves the print position forward or backward in the vertical direction from the current print position to the new print position specified in the P1 and P2 parameter frames. |
| Load Alternate Characters (LAC) | 2B | FE | NN | MM | | | Data allows customer designed fonts or characters to be loaded for printing. |
| Set Line Density (SLD) | 2B | C6 | NN | P1 | | | Selects vertical line density of 6 or 8 lines per inch or any distance in multiples of 1/72 inch up to 255. |

STATUS AND ERROR INFORMATION POLL RESPONSE FRAMES

Following a power-on reset (POR), the printer subsystem responds to controller polling with a single status frame. The printer continues to respond to controller polling with a single status frame until the printer receives a Set Mode command.

After receiving a Set Mode command, the printer responds to polling with two status frames.

Status information described in frame 1 is the same in either case. This operation is described in the previously referred to William W. Boynton, et al patent application.

MICROPROCESSOR CONTROL—PRINTER SUBSYSTEM

Figure 7A:
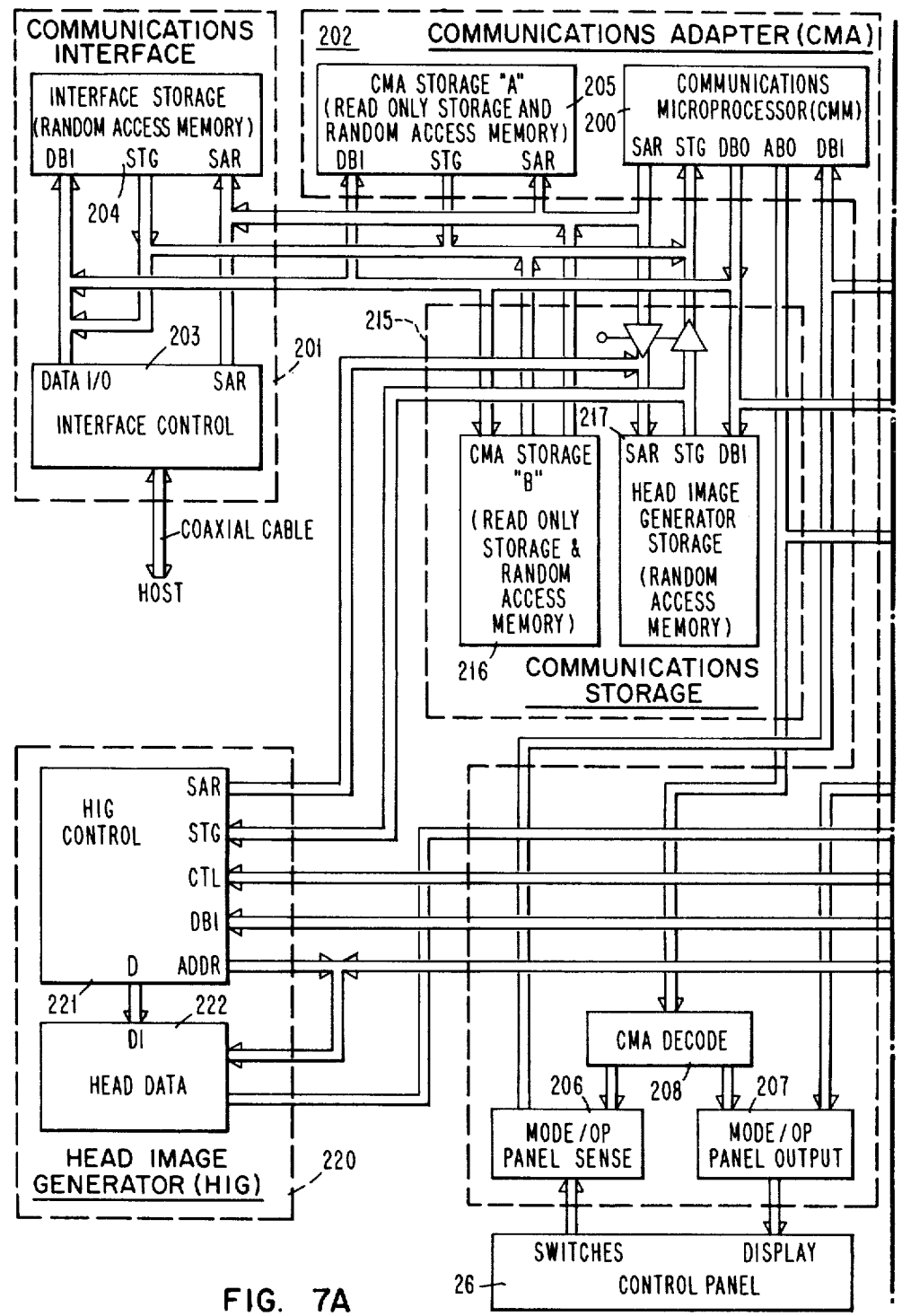
FIGS. 7A and 7B, when arranged as shown in FIG. 8, comprise a block diagram of the printer control unit including a Communications microprocessor (CMM) and a Control microprocessor (CTM) as well as a number of elements in the printer unit.
Figure 7B:
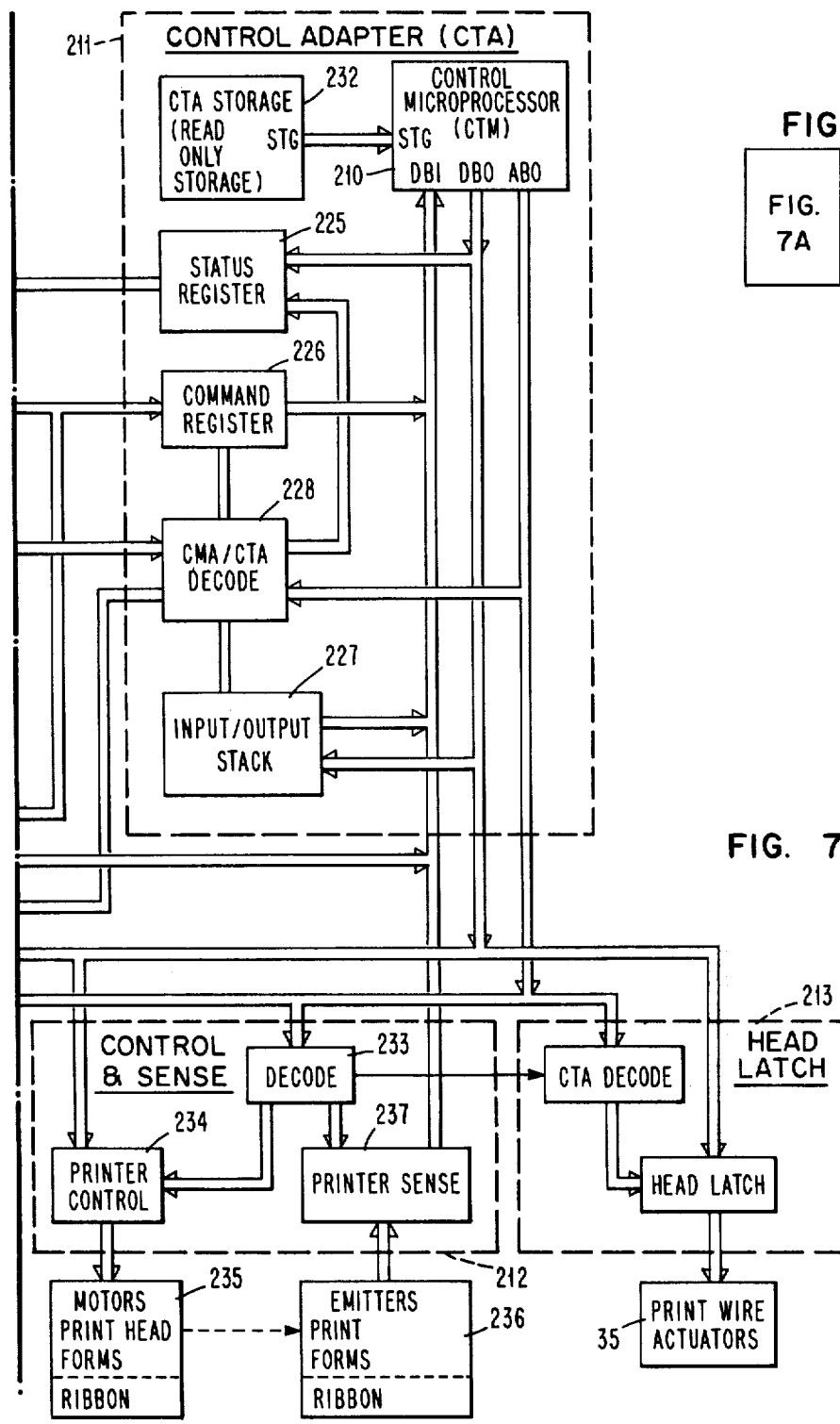

Two microprocessors are provided for the printer subsystem, each having its assigned functions and both can operate concurrently to accomplish the required functions. FIGS. 7A and 7B join together as shown in FIG. 8 to illustrate the details of the Printer Control Unit 3 and Electronics 4, FIG. 1.

The microprocessors may be of the type described in U.S. patent application Ser. No. 918,223 filed June 23, 1978, now U.S. Pat. No. 4,179,738 which issued Dec. 18, 1979, having P. T. Fairchild and J. C. Leininger as inventors and entitled "Programmable Control Latch Mechanism for a Data Processing System". Various abbreviations used herein are listed in Table III below:

TABLE III

| | |
|---|---|
| ABO — Address Bus Out | DBO — Data Bus Out |
| CMA — Communications Adapter Card | HIG — Head Image Generator |
| CTA — Control Adapter Card | MODE/OP — Mode/Operation |
| | ROS — Read Only |

TABLE III-continued

| | |
|---|---|
| CTL — Control | SAR — Storage Address Register |
| D — Data | |
| DI — Data In | STG — Storage Bus In |
| DBI — Data Bus In | |

There are actually seven main blocks comprising the Printer Control Unit representing seven printed circuit cards. The first block is the Communications Interface 201 between the host system and digital printer electronics. That interface communicates with the Communications Adapter (CMA) 202 which is a microprocessor card that takes the host information and compiles it into a form that can be used by the rest of the printer. The CMA includes Communications microprocessor CMM 200. From there, the information is passed on to the Head Image Generator 220 card for building images for the printer. There is another microprocessor card that is the Control Adapter Card (CTA) 211. The CTA includes Control microprocessor CTM 210. The Control Adapter handles the processed information from the Communications Adapter, controls all the mechanical elements of the printer, such as the motors, and receives emitter signals indicating positions of the mechanical elements. This Adapter handles communication with the actual hardware through the Control and Sense card 212 and the Head Latch card 213 that stores the data to be outputted to the wire actuators.

Within the Communications Interface are two blocks. One is the Interface Control block 203; the other is the Interface Storage block 204. The Interface Control block 203 interprets the information coming from the host system in an analog signal form, processes it into digital form, and generates the necessary timing signals to be able to store this information in the Interface Storage 204. The Interface Storage 204 is a Functional Storage Unit (FSU) random access memory which is sized at one K (1K) bytes. All data and commands from the host system go into this Interface Storage; it acts as a buffer for the Communications Adapter 202. Within the Communications Adapter card, there are five blocks. There is the Communications microprocessor 200 (CMM) and its corresponding storage 205 designated "A" which includes both random access memory and read only storage (ROS). There is a Mode/Op Panel and Sense block 206 that can read the panel 26, a Mode Op Panel Output block 207 to output displays to the panel, and Decode Logic 208 for these functions. The Communications Adapter 202 translates the information that the host has sent over through high-level or hand-shaking type procedures and translates it into much more simple terms such as characters to be printed or carriage returns, or line feeds—any other mechanical type control that needs to be performed. Its program is stored in the Read Only Storage (ROS) of the CMA "A" storage. There are 6K bytes in this ROS. The CMA also handles Hardware Operator commands involving printing the printer on-line, taking it off-line and displaying any type of status information through the display on the Mode Operator Panel 26.

The Communications Storage card 215 has two blocks entitled CMA Storage "B" designated 216 and Head Image Generator (HIG) Storage 217. Storage "B" block 216 contains up to 14K bytes of ROS storage in FSU technology for the Communications Adapter microprocessor 200. The random access memory storage 217 has 3K bytes for the Head Image Generator and is where the Communications microprocessor stores character images to be printed. The character images in this storage are used by the Head Image Generator to generate actual images for the slanted heads. Also, in the block of random access memory are two text buffers and some scratch pad storage.

Because of the staggered slant geometry of the print head assembly and the multiple head configuration, a fairly complex Head Image Generator 220 (HIG) is required to convert conventional character dot format to a slanted format. HIG processes the character images as they would normally apear in a "straight-up" format, but slants them for the Head Latch block 213 to supply to the print wire actuators. This is done through hardware routines that are performed in the Head Image Generator 220. There are basically two blocks in the Head Image Generator, one block being the Control block 221 that actually performs the hardware routines to take the unslanted image and slant it. There is also a Data block 222 that is a small storage unit in which the Head Image Generator stores the slanted information currently being worked on. The Control Adapter 211 can then read this storage and output to the wire actuators through Head Latch 213. This is the slanted data.

The Control Adapter (CTA) 211 has six blocks within it. The Control microprocessor (CTM) 210 receives inputs from various sensors, e.g., ribbon reverse/jam, forms jam, head position, linear encoder, forms position encoder, as well as print commands and data from CMM 200 and HIG 220 and generates print wire firing signals and various control signals to control the ribbon drive, print head drive, print wire actuators, and forms drive. The Control microprocessor (CTM) 210 has a ROS storage 232 that is 12K bytes of FSU ROS to contain its programs or routines. Certain communication registers including Status register 225 and Command register 226 allow the Communications Adapter 202 and the Control Adapter 211 to communicate with one another. Through these registers go commands such as Print commands, Forms commands, Carriage Returns, and the actual decoded messages that the host has sent over. An Input/Output stack 227 is used as a local storage, that is, it is a small random access memory for the Control Adapter to store intermediate data and there is some associated decoding. The Decode block 228 handles the timing relationships for the Communications Adapter and Control Adapter to be able to talk to one another asynchronously.

The Control and Sense card 212 handles the information from the Control Adapter card 211 and interfaces with the actual printer electronics to control by way of Decode block 233 and Printer Control block 234 the head motor, the forms motor, and the ribbon motors represented by block 235. Through blocks 236 and 237 it senses the positional state of printer electronics and mechanics such as the print emitters, forms emitters, etc.

The Head Latch card 213 is another interface card from the Control Adapter that latches up the wire image data, the slanted data that is received from the Head Image Generator 220, and outputs it at the correct time to the print wire actuators so that the dots get printed in the correct place on the form.

A typical print operation is now described. It is assumed that a single print line is provided by the host with a Forms Feed and Carriage Return at the end which is a typical situation. This information comes over in a serial stream from the host as analog signals into the Communications Interface 201 which digitizes the analog signal and stores it in its Interface Storage 204 in the form of characters to be printed. A command informs the Communications Adapter 202 that this is a line to be printed and that it has Line Feed and Carriage Return commands. The Communications Adapter 202 seeing this information appear, will take the characters to be printed out of the Interface Storage 204 and put them into a selected text buffer in CMA Storage "B" on Communications Storage card 215. It then tells the Control Adapter 211 that it has information in a text buffer to be printed.

The Control Adapter, after receiving the information initially tells the Head Image Generator 220 (HIG) that there is data in the selected text buffer that needs to be slanted. Head Image Generator 220 then slants this information, while the Control Adapter card 211 starts the printer in motion; that is, it starts moving the print head carrier 31. It moves the carrier through commands given to the Control and Sense card 212, and it looks for print emitters, or emitters which tell the Control Adapter when to fire wires; it checks for these signals coming from the Control and Sense card. When these signals appear, the CTM retrieves the slanted wire information from the HIG and passes it to the Head Latch card 213 and fires the wires to print dots. The Control Adapter 211 for each print emitter that it sees, asks the Head Image Generator for a new set of slanted data. This is outputted to the Head Latch card 213 and is repeated until the entire text buffer has been printed, that is, all the information that the host sent over. Once the Communications Adapter 202 has seen that this has taken place, that is, the printing has been done, it passes the forms command to the Control Adapter 211. Control Adapter 211 decodes this command and gives a command to the Control and Sense card 212 to move forms a certain number of forms emitters. It senses these forms emitters through the Control and Sense card again.

COMMUNICATIONS MICROPROCESSOR (CMM) OPERATIONS

Figure 9:
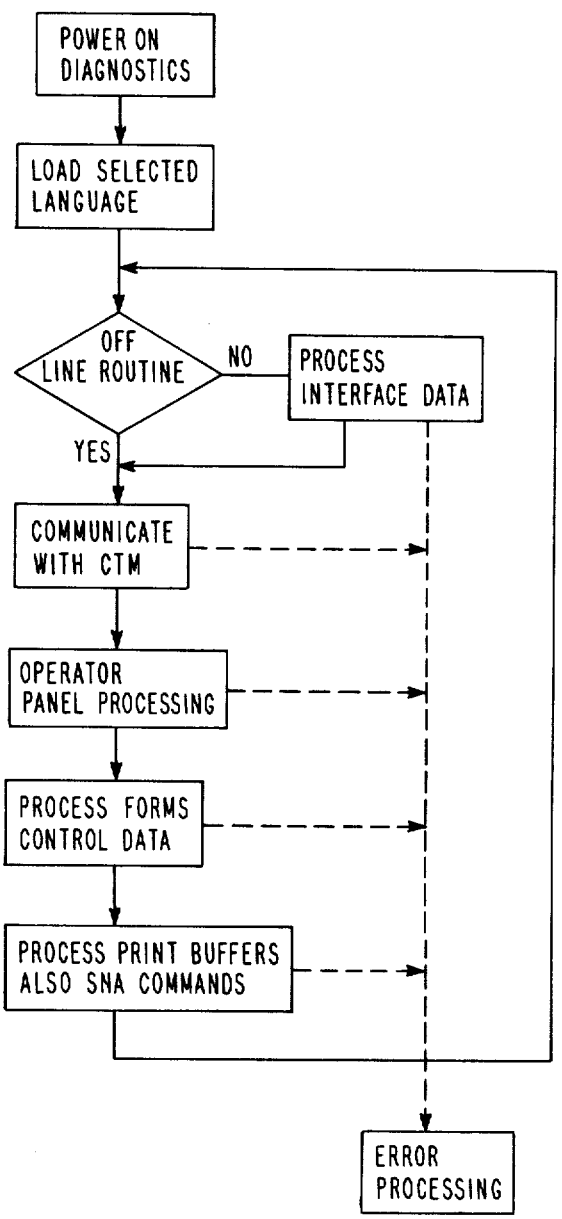
FIG. 9 is a generalized flowchart of the program routines for the Communications microprocessor (CMM) shown in FIG. 7A.

The Communications Microprocessor 200 (CMM) Flowchart, FIG. 9, represents its general operation and starts with the Power On Diagnostics being run. At the conclusion of the Power on Diagnostics, the selected language is loaded into the front Memory for processing and printing. A decision is now made as to whether the Mode Switch is in the off-line or on-line position. If it is in the on-line position, then the interface data is processed, or information coming from the host or going to the host, is processed and prepared. If an off-line routine was indicated, then this process is skipped. In any case, the chart continues to the next block no matter which off-line routine is processed. This block represents communication with the Control microprocessor 210 (CTM). This allows the CMM to receive any errors or information that needs to be passed to the host and it allows the CMM to pass data and commands such as data to be printed, forms, spacing, etc. on to the CTM. Next, the Operator Panel is accessed to determine whether the Start button, Stop button, or other buttons have been depressed for entry information from the Operator Panel. Next, the Process forms or Control data block is checked to determine the movement of forms resulting from commands sent to the CTM. Next is to Process the text buffers which includes SNA commands or the off-line routines. The CMM places them in the proper text buffer to be printed by the CTM and directs the CTM to pick this information up and place it on the paper as dots. All of these routines have a means of communicating with the error processing routine. At the end of the routine, the CMM checks for on-line or off-line status and continues the process again.

CONTROL MICROPROCESSOR (CTM) OPERATIONS

Figure 10:
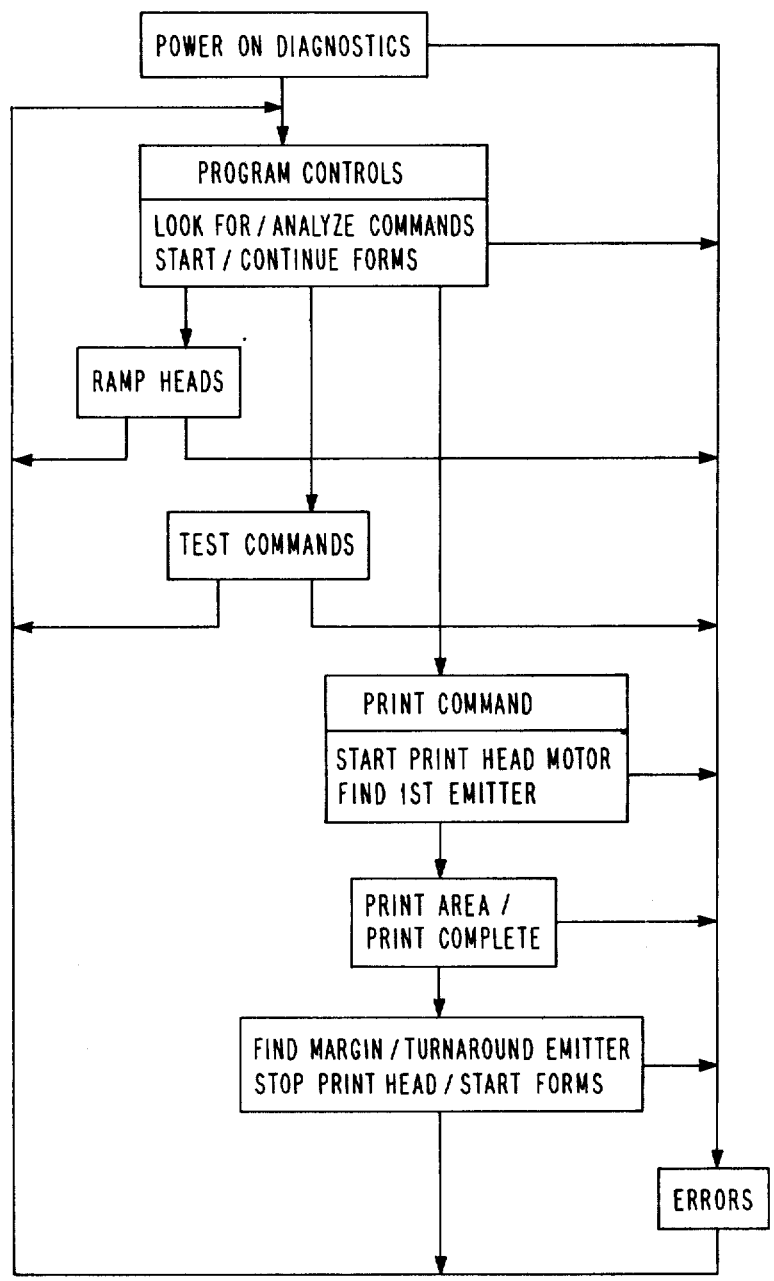
FIG. 10 is a generalized flowchart of the program routines for the Control microprocessor (CTM) shown in FIG. 7B.

FIG. 10 is an overall block diagram of the Control microprocessor 210 (CTM) operations. The CTM goes through Power On Diagnostics upon Power Up and then upon successful completion of that proceeds to Program Controls. The function of this is to look for and analyze commands from the Communications microprocessor (CMM) and start or continue forms operation. When a command is determined, if it is a Print Command, CTM starts the print head motor and looks for the first print emitter. Upon finding the first print emitter, CTM goes into the Print block and stays in that area printing the line of data until it reaches Print Complete representing complete printing of the line. Then CTM goes into the margin routines to find the margins or a turnaround emitter. Once the margins or the turnaround emitter are determined, CTM stops the print head, starts the forms and returns to Program Control to look for and analyze further commands. If CTM receives additional commands from the CMM, upon completion of the forms operation, it starts the next print operation. Out of any of these blocks, if an error is detected, CTM exits and goes into an error routine to determine what and where the error is. It notifies the CMM of the error. The CMM, based on the type of error, will either retry the command or stop the operation of the printer and notify the host.

STORAGE AND REGISTERS—CONTROL MICROPROCESSOR

Besides the sixty-four bytes of random access storage in stack 227, FIG. 7B, the control microprocessor 210 has a number of internal four-bit registers (bits 1, 2, 4, 8) to use for storage. An assignment for these registers is shown in FIG. 16. There are sixteen registers 0 through 15 and sixteen data registers—D0 through D15. There are also two sets D01 and D02 which are called the Main and Auxiliary Data Address Registers. Each register is four bits long. Registers 0 and 1 are used as input/output and work registers. Registers 2, 3 and 4 are used as work registers. Register 5, PEMT is the Print Emitters register. PHF stands for Printhead Flags. It contains individual bit assignments which indicate Print Complete, a Park Flag, a Density Change Flag, and a Forms Start Flag. Register 7 is called the Flag 1 Register and again contains individual bits. HIGST is the Head Image Generator Start Flag. The next is the Text Buffer Flag; it tells which text buffer is being worked with. RV is a Reverse Flag that indicates reverse Head Motion. CD15 is the Character Density or 15 characters per inch flag. In Register 8, which is called Flag 2, there is a Turnaround Okay Flag which indicates when reverse direction of the head is permissible, a Forms Time Flag that controls the timing sequence of calling the Forms Routine, a Ribbon Motor on Flag and a feedback from the Wirelatch Card. Register 9 is Wire position. This is a counter in which the matrix positions within a character are counted. There are nine vertical rows of dots and this maintains synchronization of dots vertically within a character. Register 10 is called the False Emitter Counter. There are two bits, False Emitter 1, False Emitter 2; this counts the false emitter cycles. There is a Forms Direction Flag and a Diagnostic Flag that tells when the system is in a diagnostic mode. In register 11 there is the Printer Error Flag; and a Head Home Flag that tells when the print head is on the ramp at the Home Position, a Turnaround Edge Flag and a Head At Turnaround Flag that synchronizes when a random turnaround is done in the middle of the printline. There are Command Flags—a Test Command, a Forms Command, a Print Pending and a Print Command. Registers 13, 14, and 15 comprise a print emitter counter that is used to count print emitters as the head moves left or right during printing.

Registers D0, D1, and D2 are the main auxiliary Data Address Registers (DAR's) that are used as address registers. Registers D3, 4 and 5 are referred to as the Right Margin Value Registers. This is a twelve-bit value that informs the microprocessor the emitter count corresponding to the right margin of the print line that is being printed. This is set dynamically for each print line. Every time a line is started the subsystem develops the number of the final emitter, of the last character that is to be printed for that line. It is calculated from a character count which the host system provides. The host sends a character count—or sends the number of characters to be printed on the line. The Communications microprocessor counts the characters to determine how many are in the line and from that and the information on the number of print heads, calculates what emitter count corresponds to the rightmost dot of the rightmost character of the line.

Register DAR 6 includes the End-of-Forms Indicators. It has a Last Direction Flag for forms—which advises the direction of the last forms operation. It has the Last Time Busy Flag for forms, the Forms Busy Sequence Flag and the End-of-Forms Error Flag which indicates that there has been an end-of-forms condition.

Register DAR 7, 8, 9 and 10 are the Forms Emitter Counter—the sixteen-bit counter that counts forms emitters. This is used in the Forms Routine, and the forms are driven in a direction to get this counter to zero. DAR 11 is Emitter Status which is where the last value of "E", the End-of-Forms Emitter, is stored and the last values of the "A" and "B" Emitters, the "WAS" value. DAR 12 is not assigned.

DAR 13, FLECT is what we call the Forms Lost Emitter Counter for error detection purposes. DAR 14 is the Forms Missing Emitter Counter. Register PT1 is called Program Timer and is used for various purposes. Its primary purpose is for the F Last Flag, or Forms Last Flag, and is used as a counter to count forms operations. When the eight-bit comes on, as it is stepped it advises that there have been eight forms commands in a row. This is used to cut down on the forms duty cycle to prevent overdriving the forms servo.

Several of the error detection counters reside in Stack 227. For instance, EOFC is the End-of-Forms Counter. Because the microprocessor has only a few internal registers to save all the data needed, some of the registers are kept in Stack 227 and brought in to the microprocessor Registers, the Work Registers, when needed, then returned to Stack 227 for later access as needed.

The sixty-four byte Input/Output Stack 227, FIG. 7B, has various data and counters and flags are stored in it. The use of them is generally as follows.

FORMS FEED MOTOR AND EMITTER ASSEMBLY

FIG. 11 is an enlarged view of the forms feed motor 23 and its associated forms feed emitter assembly 24. The emitter assembly includes emitter disk 47 mounted for rotation adjacent an optical sensor assembly 48. An enlarged portion of the emitter disk 47 is shown in FIG. 12.

DETECTION OF MULTIPLE EMITTER CHANGES

FORMS FEED OPERATION

FIG. 13 illustrates waveforms of the emitter signals A and B derived from the forms feed emitter assembly 24 during operation of the forms feed assembly in FIG. 4. Similar signals would be derived during operation of the forms feed assembly 170 in FIGS. 5 and 6 as a result of driving of motor 173. The forms feed assembly in FIGS. 5 and 6 is movable in one direction only.

FIG. 14 illustrates an arrangement of a "WAS/IS" table maintained by the control microprocessor 10, FIG. 7B, during operation of the forms feed assembly.

FORMS CONTROL ROUTINE

FIGS. 15A-15J illustrate a flow chart for the forms control routine which is used to initiate a forms command thereby starting the forms servo motor 3, FIG. 11. The microprocessor issues a command indicating which direction of movement of motor 23 and the extent of movement which in turn moves the forms in the same direction and to the same extent. Motor 23 rotates and emitter assembly 24 provides emitter signals back to the microprocessor indicative of the extent of movement of the forms feed assembly and the direction of movement.

GENERAL PRINCIPLES OF DETECTION OF MULTIPLE EMITTER CHANGES

As indicated, forms motion is controlled by the Control microprocessor and emitter changes occurring during forms motion must be monitored to keep track of the extent of motion. It is necessary to be able to recover from a missed emitter signal (emitters) and multiple emitter changes are detected without loss of information.

The extent of forms motion is determined by a preset number of emitter changes and the microprocessor control program monitors the emitters to start and stop the forms motion at the proper time.

The control microprocessor has other functions to perform besides controlling and monitoring forms motion. The scheme herein is predicated on the assumed characteristics of operation that if the Control microprocessor initiates a forms motion, then goes on to some other function, the longest period of absence before it again returns to check forms movement will be no greater than two forms feed emitter cycles. An emitter cycle is assumed as an example to be 150 microseconds. Therefore, the microprocessor could be absent to check other functions so long as it returns in approximately twice that time or 300 microseconds to recheck the forms feeding. Obviously, other forms/microprocessor timing relationships could be established, if desired.

So, to allow the microprocessor to function effectively to control the printer subsystem, it is necessary that two emitter transitions be detected and recognized as two transitions (in either direction) of forms movement. It is important that an emitter transition not be missed since no cumulative error in forms vertical positioning can be tolerated.

The emitter disk 47, FIG. 11, is attached to the shaft of the forms motor 23 and two emitter channels are used, FIG. 12. The two emitters (A & B) are symmetrical and in quadrature, that is, they are 90 degrees out of phase, FIG. 13.

Forward motion is accomplished with the phase sequence
AB $\overline{A}$B A$\overline{B}$ $\overline{AB}$ AB etc.
while reverse motion is accomplished by the sequence
AB A$\overline{B}$ $\overline{AB}$ $\overline{A}$B AB etc.

The scheme described herein allows the Control microprocessor to miss two transitions, e.g., AB to $\overline{AB}$, without incurring any actual loss of data.

In the "power on" sequence, the forms emitters are read by the Control microprocessor 210, FIG. 7B, and saved. Then, when forms motion is started, microprocessor 210 looks for a change in state of the emitters. The microprocessor also has knowledge of what direction it has been told to move the forms.

The new forms emitters are read and compared with the previous forms emitters. The new and previous emitters are used to index the table, FIG. 14, which indicates which direction the forms moved and how far, and which is stored in Read Only Storage 232, FIG. 7B.

If no movement has taken place, then a 0 is present in the table. The forms may have moved +1 (indicating one emitter forward, −1 indicating one emitter in reverse, and ±2 indicating two emitter transitions.

A transition of two emitters does not indicate in which direction the transition was made. This information is known by the Control microprocessor 210 already and the proper adjustment in the right direction is made. Then the Control microprocessor compensates for the extent and direction of movement and updates its tables to accurately reflect the present location of the forms.

The table, FIG. 14, may be modified so that it would be possible to miss three emitter transitions. The direction indication present in the controller is used to select one of two tables, one used for motion in the forward direction and one used for motion in the reverse direction.

DETAILED DESCRIPTION OF FORMS CONTROL ROUTINE

The entry point in FIG. 15A is Servo Start (SSTRT). This is a point that initiates forms movement upon a Forms command from the Communications Microprocessor 200, FIG. 7A. The command consists of two bytes that initiate the number of emitter forms that are to be moved and other bytes that indicate the direction. Read Hardware Error byte is next. This byte has hardware error condition flags, and if the forms tractor or the printer cover is open, the routine immediately returns and does not initiate a Forms command. If the cover tractor is closed, next is Read Forms Status word to check if the forms are busy. If they are busy, it is an error; they should not be busy at this time. Next, if the forms are not busy, a Forms Start flag is turned off. This was set by the control program to indicate the start of a forms operation and that flag initiated the entry to this routine. Then a check is made to see if the last eight or more commands in a row have been Forms commands. If the response is No, counter PT1 is stepped by 1 and if Yes, it is bypassed. This sets a flag which goes on after eight sequential forms operations have occurred and in the control program it slows down the repetitive rate of handling forms commands so that the servo duty cycle is not exceeded. Approximately a 50 millisecond delay then will occur between forms commands.

Next is block SST2, which stands for Read Low Byte emitter count from the I/O registers. Next is Read High order byte emitter count from the I/O registers. This is the count of emitters to be moved in this forms command. A check is made to see if the direction forms are moving on this command is the same direction as last time. If not, End-of-Forms Counter is reset and the Direction Bit is reset. This allows detection of end of forms from the end-of-forms emitter 25, FIG. 4. If movement is in the same direction, sensing continues for end of forms. If there is a change in direction, then the count is reinitialized. A check is thus made for the distance forms travel before another signal is received back from the forms assembly indicating that it is in motion. That signal is received for a larger predetermined number of emitters.

Figure 15B:
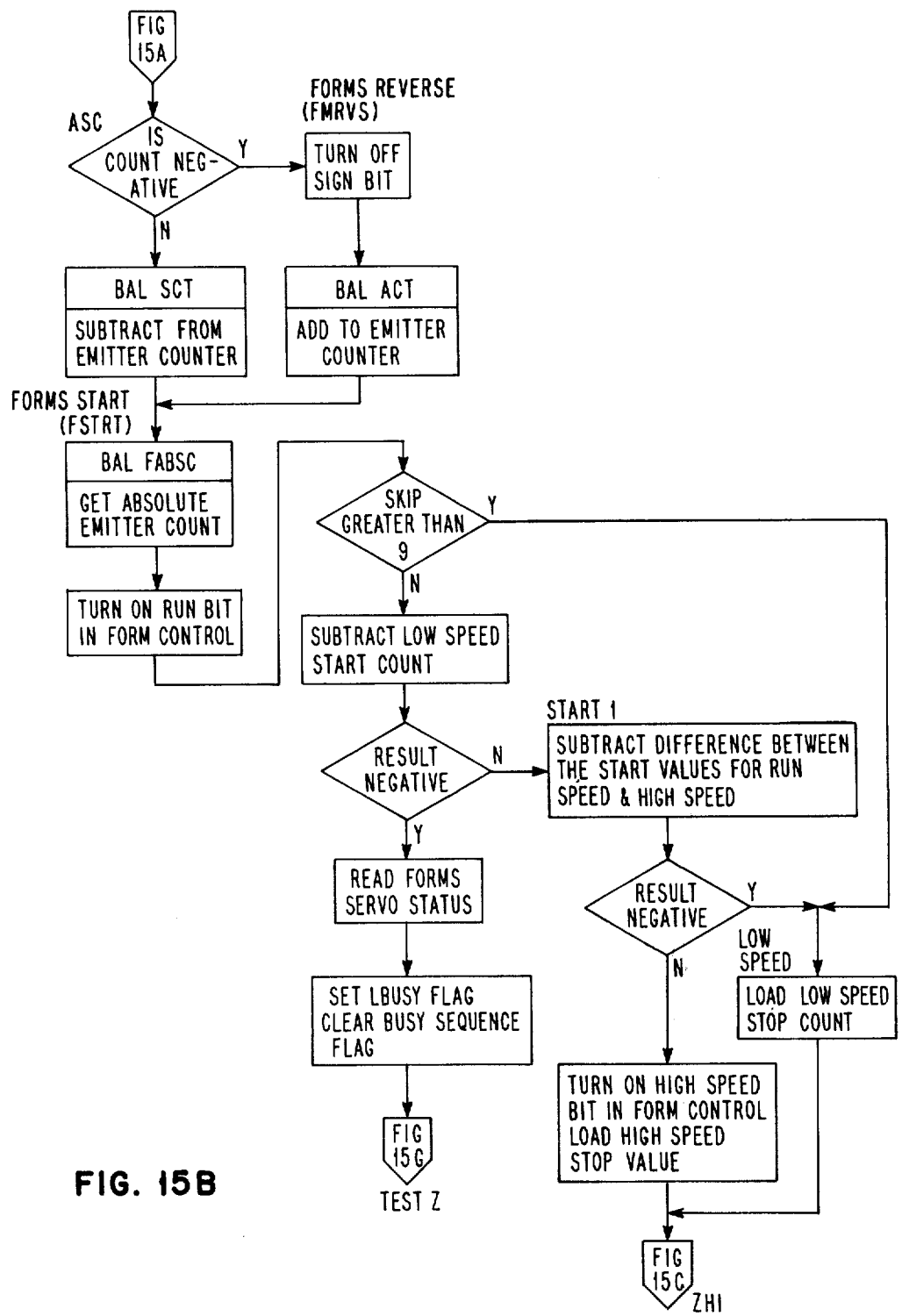

Next, the routine proceeds as shown in FIG. 15B. At Label ASC, a check is made to see if the count of emitters to move is negative. If it is, the Sign Bit is turned off and the count of emitters to be moved is added to the Emitter counter. If it is not negative, then the count of emitters to move is subtracted from the Emitter counter. This is a position error indicator. If the counter is negative, it means forms have to move forward; if the Counter is positive, it means forms have to move backward. This assumes that forward motion of the forms is a positive direction; reverse motion of the forms is a negative direction. When the Emitter counter reaches zero (0), it means that forms are at their proper position.

Branch and Link Add to Counter (BALACT) and Branch and Link Subtract from Counter (BAL SCT). These are subroutines that effect an add or subtract operation.

Forms Start (FSTRT) includes a Branch and Link to the routine called FABSC, which is get the Forms Absolute Count from the Emitter Counter. The Absolute Emitter counter is obtained and a Run bit in the forms control nibble is turned on. A check is then made to see if the Skip or the Forms Operation to be done is greater than approximately nine inches. If it is greater than nine inches, the operation will be done in Normal or Full Speed. If it is less than one-half an inch, it will also be done in Run speed; between half an inch and nine inches, it will be done at High speed.

When Skip has been determined down the No leg, that is, not greater than nine inches, the Low Speed Start Count is subtracted to see if the result was negative. If the result is negative on the Yes leg, that indicates that a very short forms motion is involved and the printer will go into a Detent speed or the slowest speed operation. In this case, the Forms Servo status from the hardware is again read. Busy Flag is set because in this case Forms Run will not be turned on. The Busy flag is used later to simulate the end of the forms operation to say forms have been busy.

Normally, this bit gets set by forms actually having been busy, but in this case it is known it will actually never go busy because forms is not put in a Run operation. The Busy Sequence Flag is cleared; this is for a later error check to make sure that the Busy Line has sequenced on and off properly; that is, that the forms servo has responded properly. An exit is made to FIG. 15G, "A" input, to a Test Z which is in the forms routine. This takes control and then the forms routine will initiate the forms motion for this particular command. This happens only in the case of a very short forms operation. That is the forms motor is not turned on either to normal Run speed or to High Speed.

Test "A" involves a test of the Emitter Counter for zero (0) to see if the forms position or stop should be adjusted.

Returning to FIG. 15B, to Subtract Low Speed Start Count, if the result was not negative, then it is known that the forms have to start either in Run Speed or High Speed. The next step is to subtract the difference between the Run Speed Start value and the High Speed Start value to obtain High Speed Start difference (Delta).

One emitter count indicates a Run Speed is necessary and a higher emitter count indicates that a High Speed operation is necessary. So, a determination is made at this point whether to go at Normal Speed or High Speed for this forms operation. As a reminder, if it was greater than nine inches, this decision point was already bypassed.

If the result is negative (Yes, in this case) this time, then the assumption is that the distance to move is between the Run Speed and High Speed limits. So, the printer will run at Run Speed. The Low Speed Stop Count is loaded. This is a count of emitters that indicates now far the forms servo will coast after it is instructed to stop. The forms servo has to stop early because some deceleration occurs and the forms travel an additional distance. Thus, a Stop Count is used here for Low Speed. If the result was not negative (No in this case), then the High Speed Bit is turned on. A High Speed operation is initiated and the High Speed Stop Value is loaded. This again is the deceleration distance for a High Speed Operation. In either case, an exit is made to FIG. 15C.

Figure 15C:
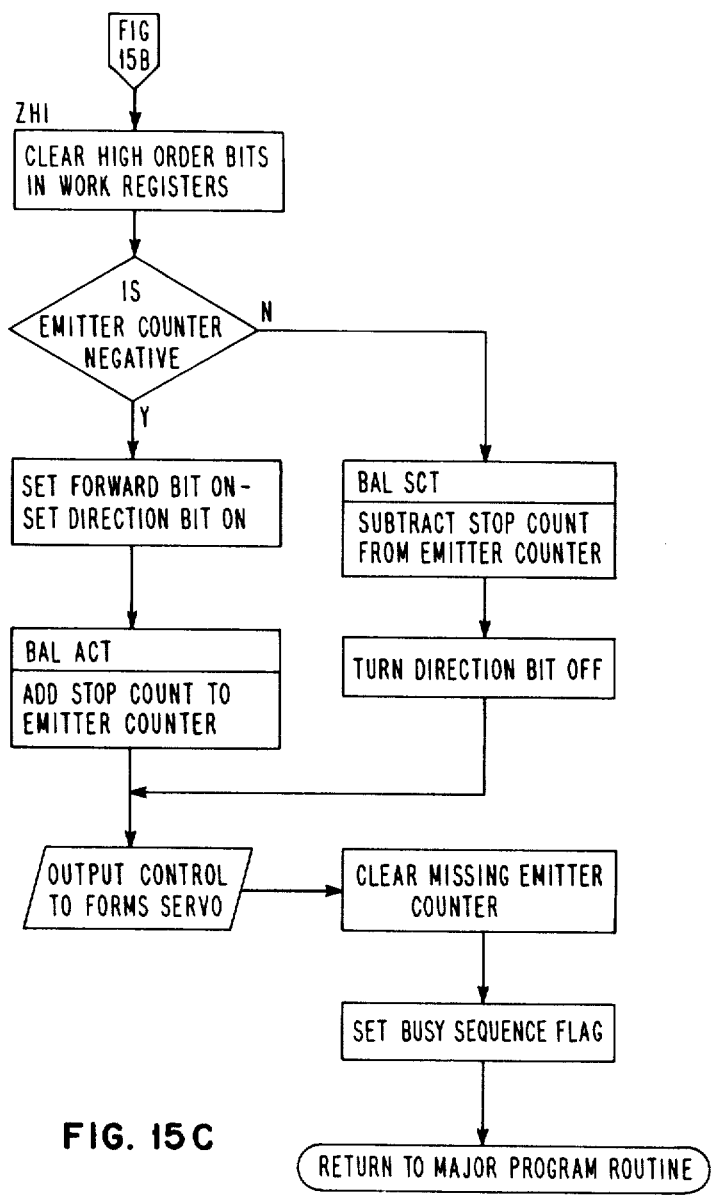

In FIG. 15C, the High Order Bits in some of the Work Registers are cleared and a check made to see whether the Emitter Counter is negative. Count of the emitter being negative or positive tells the printer subsystem which direction to initiate a forms operation. If the emitter count is negative (Yes), that indicates that the forms need to move forward bringing the counter back up to a 0 condition. At this point the Forward bit and Direction bit are set on. A Branch and Link is made to the Add To Counter routine and the stop count is added to the Emitter Counter. This offsets the Emitter Counter closer to 0 so that a stop will be initiated sooner. If a No decision occurred at the question "Is Emitter Counter negative?" that indicates a Reverse Forms motion. A Branch and Link is made to the subtract Count Routine and the Start Count is subtracted from the Emitter Counter, again offsetting it toward zero (0) in order to stop earlier. The Direction Bit is turned off. At this point an output is made to the Forms Servo. Four bits indicate speed and direction to the Forms Servo. This turns the Forms Motor on at the proper speed and in the proper direction. Next, the Missing Emitter Counter is cleared. This is used for error detection. Now that the forms are running, the control microprocessor will look for Forms Emitters to occur and will also check that emitters have occurred in the proper sequence, evidencing proper forms direction and proper timing in the forms movement if the Forms Servo is responding as it was instructed to. Next, a Busy Sequence Flag is set and will later inform the microprocessor to expect a Forms Busy indication. At this point a return is made to the major program control flow in the microprocessor.

In summary, the printer subsystem has performed in such a manner that the Forms motor has been turned on at the proper speed and in the proper direction, and the Forms Emitter Count has been initialized so that when it reaches zero (0) the Forms motor will be stopped. It is noted that the logic for the Forward and Reverse Forms movement permits fine correction of the forms location. As an example, if the forms creep forward to a greater extent than desired, the motor can be placed in reverse rotation a very slight amount to the exact location they should be in. It is especially useful in printing of graphics.

Figure 15D:
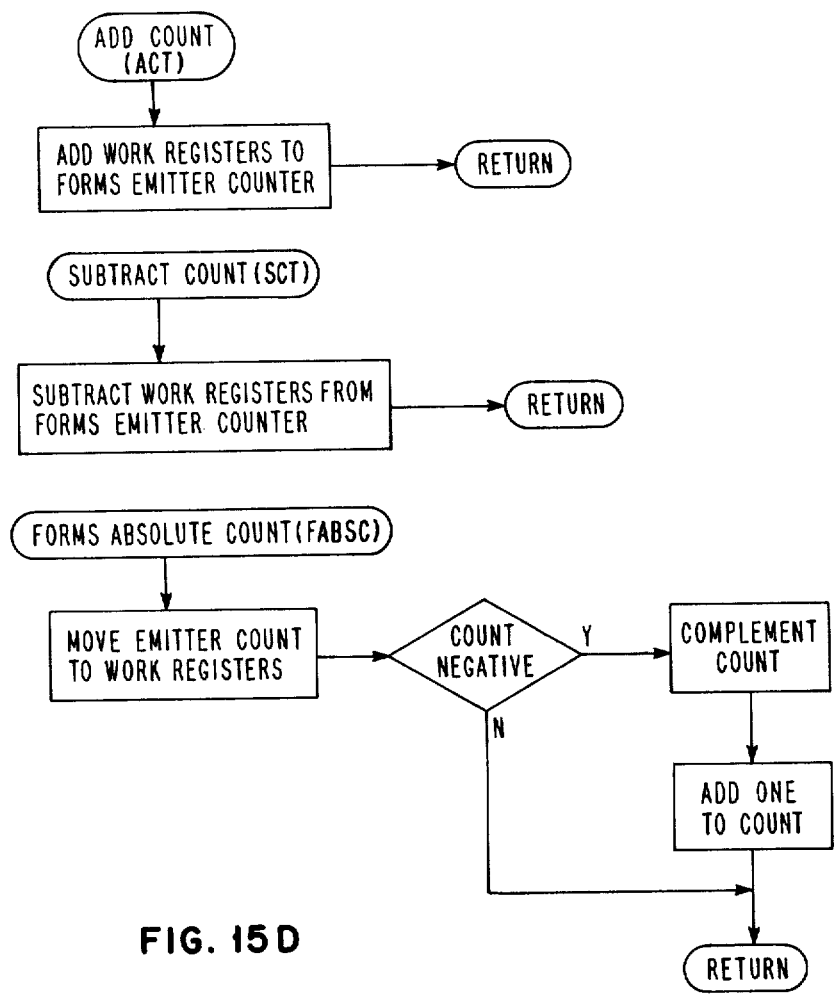

FIG. 15D illustrates several routines that have been mentioned previously. The Add Count (ACT) routine simply adds the contents of the Work Registers to the Forms Emitters Counter and returns. The Subtract Count (SCT) routine merely subtracts these same Work Registers from the Forms Emitter Counter and returns. The Forms Absolute Count transforms the contents of the Emitter Counter to an Absolute Count. The Emitter Count is negative, the contents of the Emitter Counter are moved to the Work Registers. Count is negative, the count is complemented and a "1" is added to the count. This is done since the Forms Emitter Counters carry a "two's complement" type number which may be positive or negative. If the count is not negative, a return is simply made to the main program.

Figure 15E:
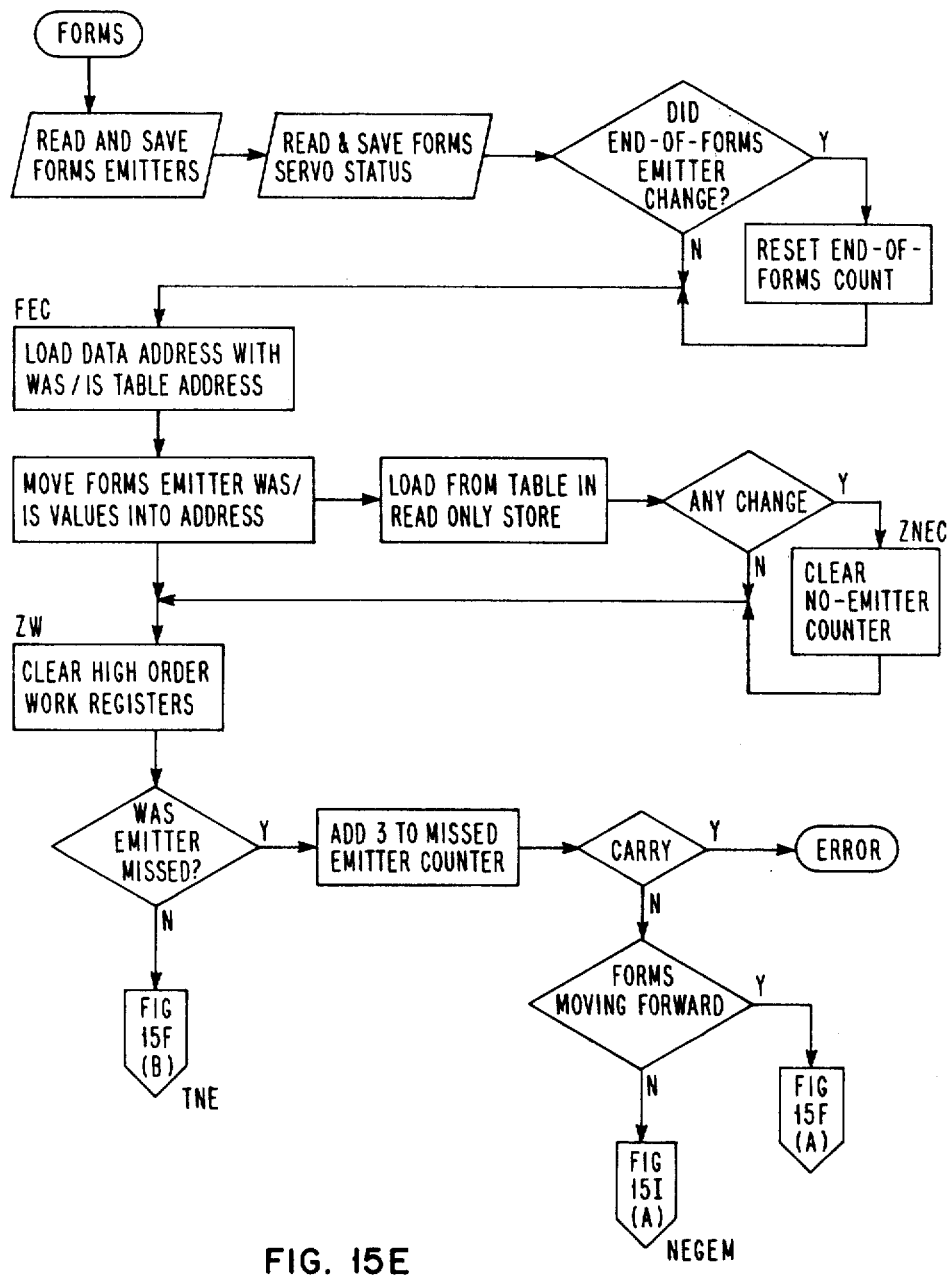

FIG. 15E illustrates the beginning of the Forms Routine. This routine is entered into continuously during operation of the printer subsystem on a periodic basis. It is entered into frequently during a forms feed operation and at a much lower frequency during printing operations. The Forms Routine has the net responsibility of stopping the forms after the previously described routine has started them. This routine brings the forms to a point at which they should be and maintains them at that point during printing operations. The entry point in FIG. 15E to the forms routine is Read and Save the Forms Emitters.

Reference is again made to FIG. 13 which illustrates the emitter pulses derived from emitter assembly 24 in FIG. 11. Two emitter pulse lines, referred to as Emitter A and Emitter B Channels are developed. These are symmetrical square waves which are in quadrature. That is, Emitter B lags Emitter A by 90° in phase. FIG. 13 illustrates what the signals in the two Emitter Channels look like when forward or upward forms motion occurs, that is, positive motion. The "AB" data read at each point by the microprocessor is located below the waveforms for Emitter A and Emitter B in FIG. 13. This comprises two bits of data, one indicating whether the A channel is up or down and one indicating whether the B channel is up or down. There are four possible bit configurations that can result. These are 10, 11, 01, and 00. The assumption is that if the subsystem is at any particular point in the bit configurations referred to as the previous point, and the emitters are read again and have changed, a determination can be made immediately as to whether the bit configuration is moving to the left or to the right and from this the direction of forms movement can be derived.

The control microprocessor utilizes inputs in conjunction with the 4×4 table stored in read only storage 232, FIG. 7B, to enter the two-bit value of what the emitters were previously and two-bit value representing the status of the emitters at the present time. FIG. 14 has zero's in at least one diagonal direction. This will indicate as an example that if the forms were in a 10 state and are now in a 10 state, no forms movement has occurred. If the forms emitters were in a 10 state previously and have gone to a 11 state, the net changes is +1, that is, there has been a movement forward of 1 emitter state. If the inputs show that there was a 10 state and it is now a 01 state, the table indicates that a plus or minus 2 emitter change has occurred, it can be interpreted as movement either in a forward or in a reverse direction. Provision is made, however, to determine the direction and to determine the forms location accurately. In this case, the printer subsystem has missed an emitter. That is, it has not checked frequently enough the emitter status and two emitter changes have occurred since they were last checked. However, the control microprocessor knows which direction the forms were instructed to move and the actual forms location can be accurately developed by the present routine. There is some flexibility in the routine and the operations of the subsystem.

As a final example in FIG. 14 a change from a 10 state to a 00 state indicates that the forms have moved in reverse 1 emitter.

The values in the table shown in FIG. 14 have a positive value when forms movement is forward and a negative value when forms movement in a reverse direction. This is the same way the movement is counted in the Emitter Counter either +1 or −1 at each step to bring the Emitter Counter towards 0.

Returning to FIG. 15E, the Forms Emitter status, that is, the Emitter Count Status of the A and B Emitters, is read and saved. In the Forms Servo status is read and saved. These are the bits that give an indication as to what the Forms Motor is presently doing, what speed and direction it is running in, etc. Then a check is made to see if the End of Forms Emitter has changed. If Yes, the End of Forms count is reset in the End of Forms Counter. If No, the next step is to load the Data Address with the WAS/IS Table Address. This refers to the 4×4 tables shown in FIG. 14. Thus, the base address of that table is loaded in the Data Address Registers. Next the "WAS" values, that is the previous values of the Forms Emitter are moved into the address specified. That is, the Table Address is modified with the past and present emitter values and the data simply loaded from the table which provides either a 0, a 1, or a 2 value as just discussed. Though the value from the read only storage 232, FIG. 7B, is loaded and a determination made as to whether there was any change or not. If Yes, the No Emitter counter is cleared. This counter informs the subsystem that there has been an emitter change, that is that the Forms Motor is moving. If the answer is No, the routine proceeds to the next step which is the clear Hi-Order Work Registers. Next a check is made as to whether an emitter was missed and indicated if a value of "2" was derived from the table in read only storage. This says that the Forms Motor has moved two emitters since the last time it was checked. It this is a Yes, the "3" is added to a Missed Emitter counter. This can happen anytime an emitter is missed and if it occurs too frequently, as is indicated by a carry from this counter, an error condition will be evidenced. There may be a hardware problem, for example, where only one of the emitters is being supplied and the system is only seeing one emitter change, rather than two. If no emitter is missed, then a subtraction of 1 is made from the Missed Emitter counter. Thus, if emitters are missed infrequently, no error will occur. If carry occurs from the Missed Emitter counter, a check is made to see if the forms are moving in forward or reverse direction and an exit is made to FIG. 15I in the case of a reverse direction and to FIG. 15F in the case of a forward direction.

Figure 15F:
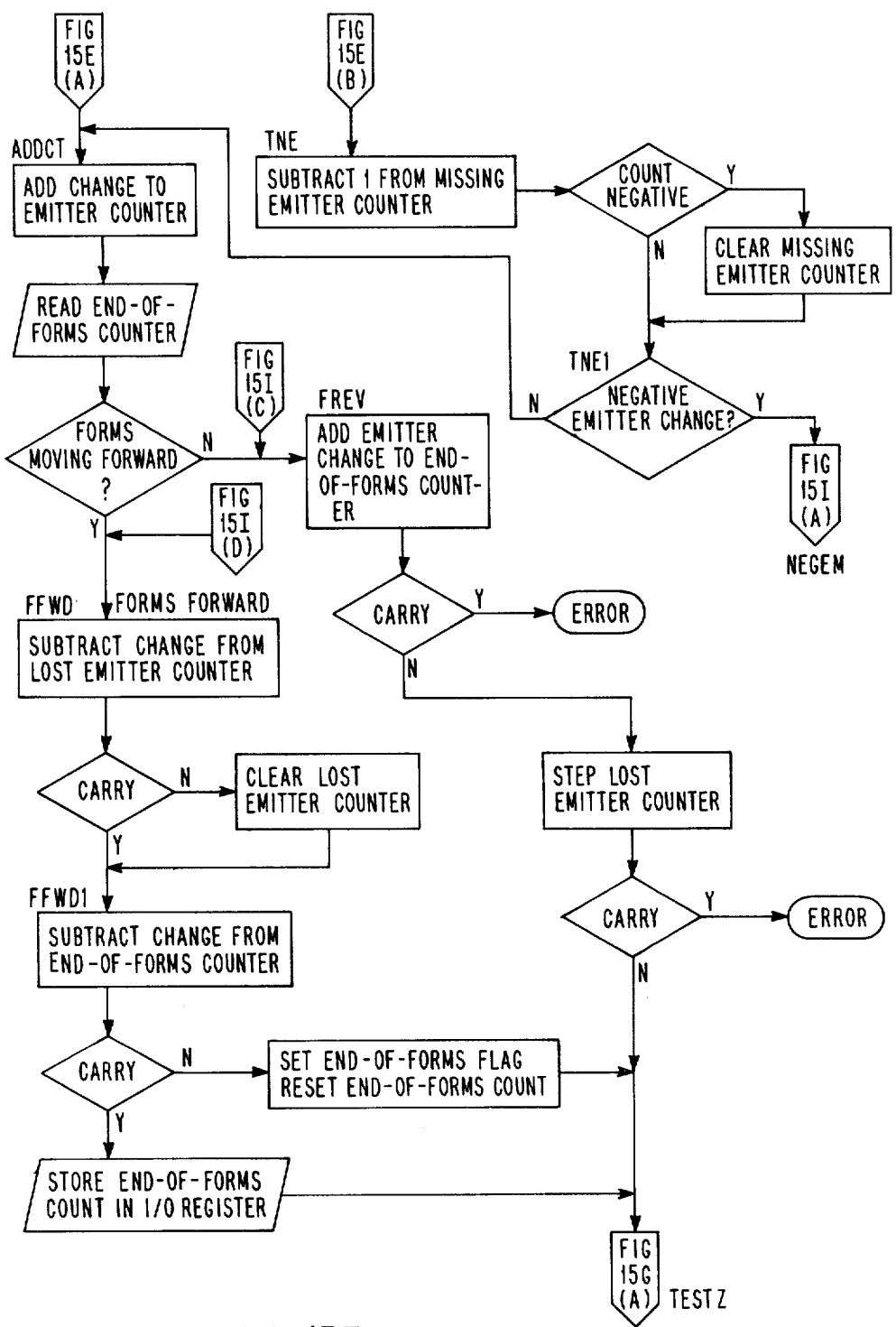

Assuming that the forms are moving forward, entry is made in FIG. 15F at point (A). This proceeds to an Add Count at which time the changes is added to the Emitter Counter. An inference is made that the change has been in the forward direction. Then the End-of-Forms counter is read. This counter is stored in the input/output stack 227. Again a check is made as to whether the forms are moving forward. If Yes, the change from the Lost Emitter counter is subtracted and a check is made for a carry from that counter. If No, the Lost Emitter counter is cleared. In either case the procedure goes to Forms Forward and the emitter change is subtracted from the End-of-Forms counter. The Lost Emitter counter is another error detection device which triggers an error if one of the emitter channels should fail completely. If, for example, either the A Channel is constantly up or constantly down the program would see one of the emitters changing and this would give evidence that the forms were oscillating or just alternating simply moving forward one emitter and then back one emitter, forward 1, back 1, etc. So even though the forms were running in a single direction the emitter signals indicate that the forms are alternating and control has been lost of the forms. The Lost Emitter counter detects this circumstance. A strategy here is to check direction since it is assumed that the forms were told to move forward and it is expected that they will be doing so. However, it is possible that the forms were instructed to move forward and that several emitter changes have occurred in the reverse direction before the servo circuits take up the slack and start moving them. Under some circumstances such as that moving in the reverse direction does not result in an error. However, if it occurred continually, it would result in an error.

In FIG. 15F at Forms Forward the emitter change is subtracted from the End-of-Forms counter. If a carry does not occur as a result of this operation, this means that the counter has reached 0 and that the End-of-Forms count has been exhausted. Next the routine goes to the block End-of-Forms counter 0 and the End-of-Forms Flag is set and the count reset. At this point a detection has been made that the motor moved a distance sufficiently so that a transition should have occurred at the End-of-Forms counter. If the paper movement has not been detected, an inference can be made that either the printer is out of forms or that there has been a forms jam. This flag is set to report to the communications microprocessor in order to advise the operator and to stop the machine. If the count is not exhausted, the End-of-Forms count is simply stored back in the input/output stack 227, FIG. 7B. Returning to the question "Are the forms moving forward?", FIG. 15F, if the answer is No and it is assumed that the command had been given to move forward, then the emitter change is added to the End-of-Forms counter to increase the End-of-Forms count evidencing a condition that the forms have backed up counts are adjusted to that condition. If a carry is obtained from the End-of-Forms counter, the procedure goes to an Error Routine and it is indicated that the forms have been moving in a reverse direction much farther than should have been expected. It is permissible for the forms to go in the opposite direction for one or two emitter times. If emitters are not received fairly continuously in a very short time an error is indicated. If a carry is not received, then the Lost Emitter counter is stepped. This again is the detection mechanism for determining that an oscillation condition is occurring. If a carry occurs from that counter, an error will be indicated.

Figure 15G:
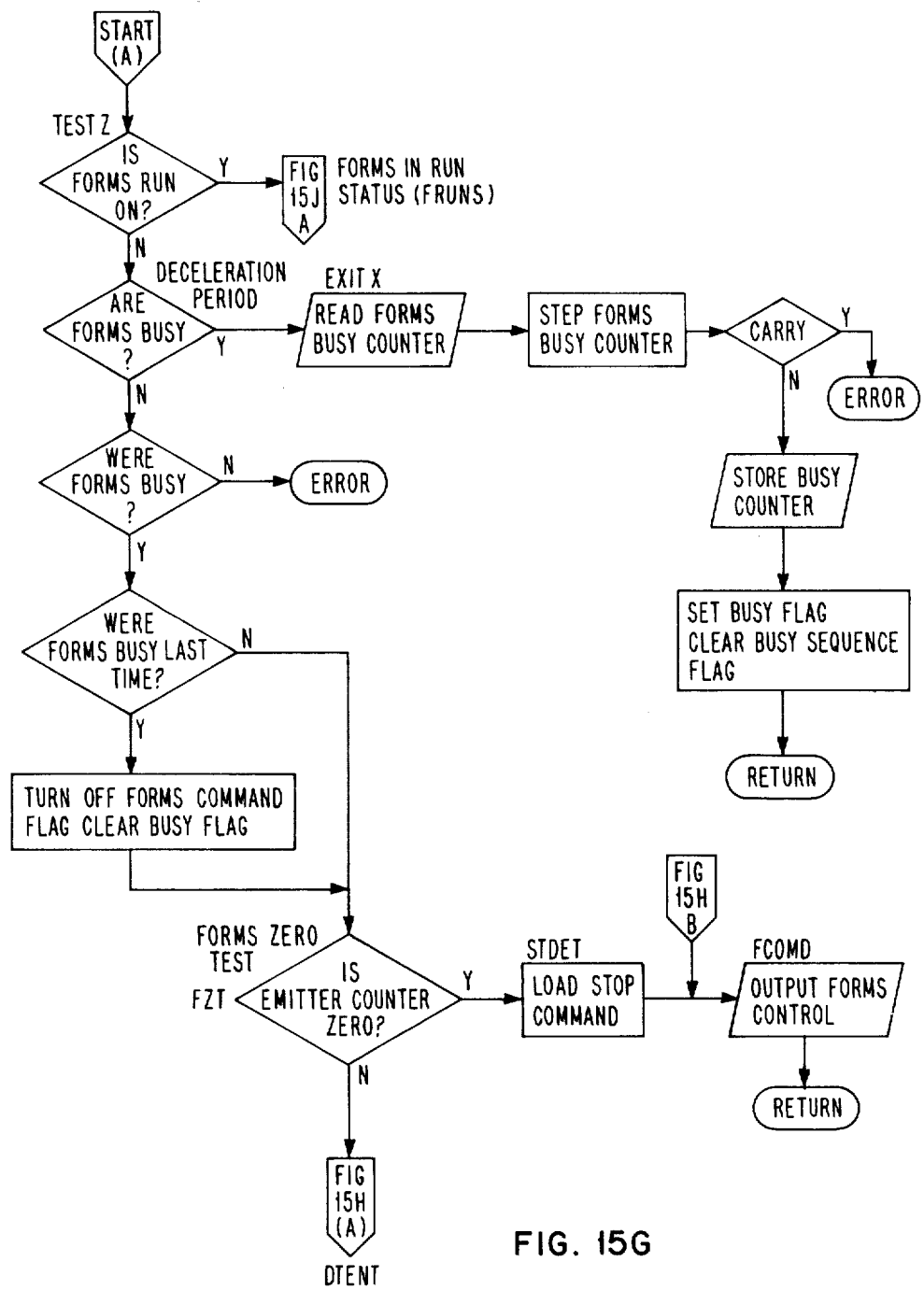
Figure 15H:
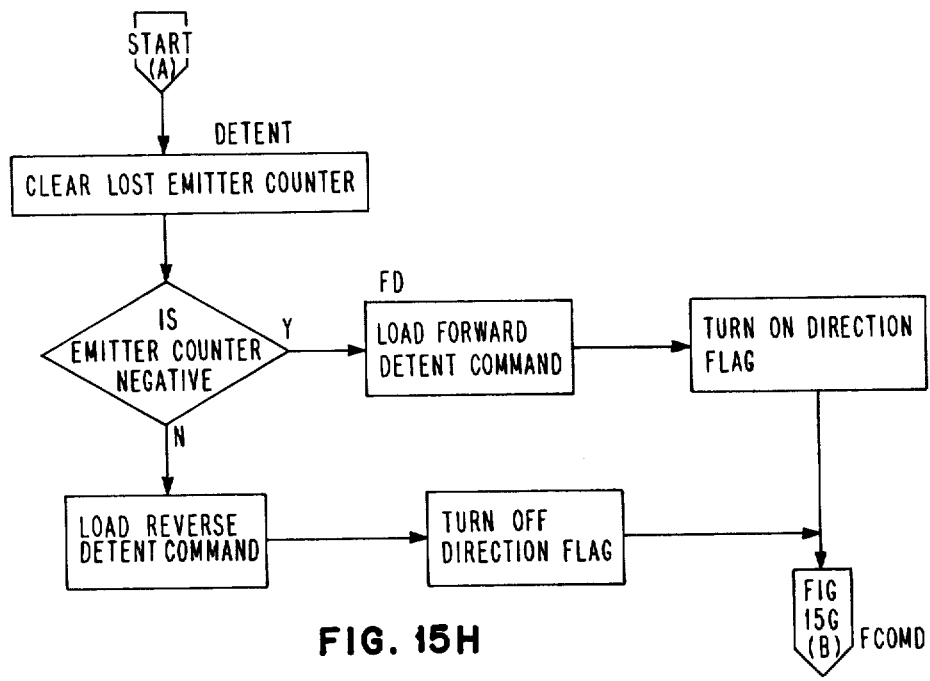

In FIG. 15G a test is made referred to as Test Z to see if the Forms Run is on. This says that the forms motor is running at this point. If the answer is Yes, the procedure goes to FIG. 15J, the "A" input. If the answer is No, a check is made to see if the forms are busy. If the forms are not running and the forms are busy, this indicates that the printer is in a deceleration period. During this time the control adapter waits for the deceleration to be completed and to determine where the forms actually stopped and then to do a fine adjustment. Here the Forms Busy counter is read and stepped. Provides a limitation on how long the forms can remain busy during this period after they have been instructed to come to a stop. If too long a time occurs then a Carry results and this will lead to an error indication. If no Carry occurs then the Busy counter is stored and the Busy Flag is set. The Busy Sequence flag is cleared to indicate that the forms were busy as they were expected to be. Then a return is made to the microprocessor main program. Later the microprocessor will again re-enter the forms routine in FIG. 15G. If a No occurs when the question "Are forms busy?" is asked, then a check is made to see if forms were busy. If the answer is Yes, then a check is made were forms busy last time. This is the point where the Forms Command flag is turned off and the Busy flag is cleared. This is also the point where the Control microprocessor can conclude that the Forms Command has logically been completed. The Forms Assembly and particularly the Forms Motor have finished decelerating and it is expected that the control adapter will be within one or two emitters of where it should be. A completion of the Forms Command therefore is indicated at this point. The routine proceeds to the Forms Zero Test and a check made to see if the Emitter Counter is at zero. If Yes, a Stop Command is loaded and outputted to the forms in order to stop the forms motor and a return made to the main program. If the Emitter counter is not zero, the Forms Control routine proceeds to FIG. 15H, input (A). There, the Lost Emitter counter is cleared because it is not now desired to detect an error of forms oscillating back and forth. That may be a normal operation while the Forms Assembly is in the detent mode which is now occurring. An adjustment is continuously made in the direction of the forms to keep them at the zero point if they creep away from that point. A check is made to see if the Emitter counter is negative in FIG. 15H. If Yes, the forward detent command is loaded. If No, the reverse detent command is loaded. Also, the Direction Flag is turned on or off, as appropriate, and a return made to FIG. 15G input (B) where an output is again made to the Forms Control to the Forms Servo and a return to the main routine.

Figure 15I:
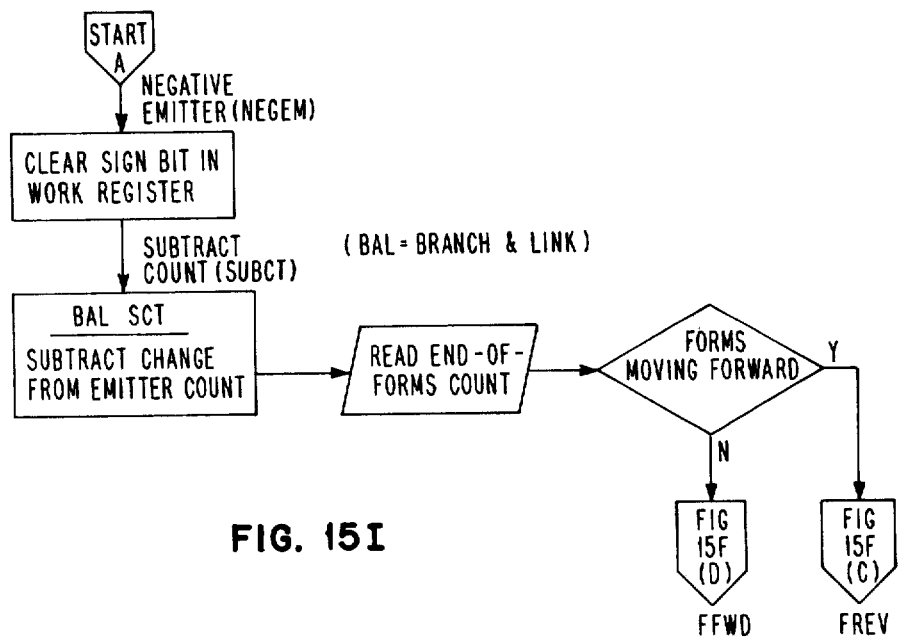

Referring to FIG. 15I it is assumed that an emitter was missed with the forms running in the reverse direction. The entry point is when a negative emitter has occurred. The sign bit in the work register is cleared which is merely a housekeeping routine. Then a Branch and Link is made to the Subtract Count (SCT) in order to subtract the change from the Emitter count. Thereafter, the End-of-Forms count is read and a check made to see if the forms are moving forwardly or reversely. In either case, a return is made to FIG. 15F. If the direction is forward, the return to FIG. 15F is on input (D) while if the Yes is effective in FIG. 15I then the return is made to input (C). Thus, a return is made back to the same logic in FIG. 15F involving the incrementing and decrementing of the End-of-Forms detect counter and the Lost Emitter counter in order to detect errors.

Figure 15J:
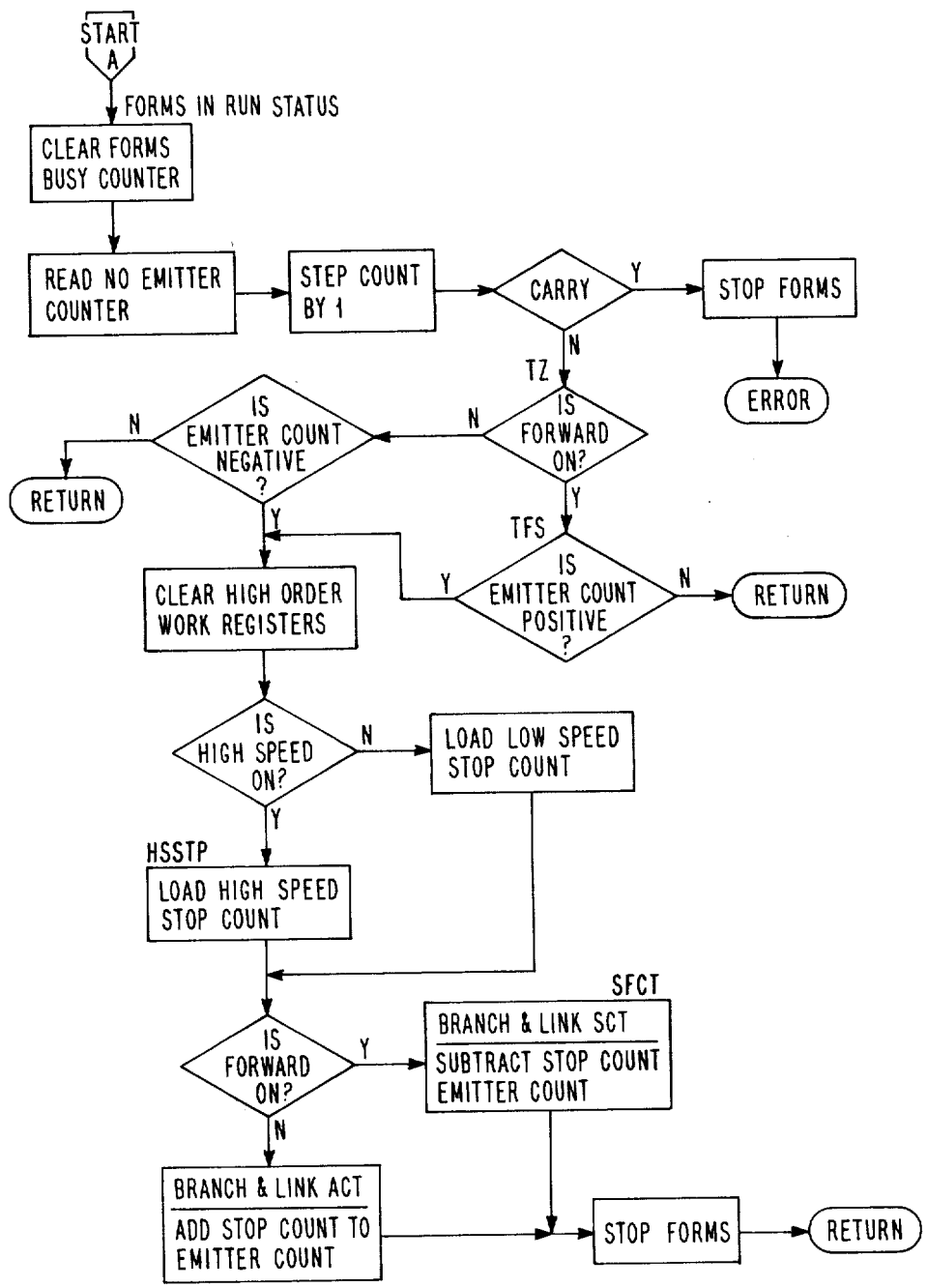

Reference is now made to FIG. 15J, input (A). This is from a Forms and Run status condition. The Forms Busy counter is cleared. This is the counter which is stepped during the busy period. Also the No Emitter counter is stepped by 1. If a Carry occurs, the forms are stopped and the subsystem goes into an error routine, since an indication is made that the forms has been placed in a RUN condition but there are no emitter changes.

If exit is from the No leg and proceeds to the TZ block a check is made to see if FORWARD is on. If Yes, a check is made to determine if the Emitter count is positive. If not, a return is made and this indicates that the system will remain in a RUN status allowing the forms motor to continue running. If the routine exits at the No leg with FORWARD on, a check is made to see if the Emitter count is negative. If No, the routine again returns and allows the forms motor to continue running. With FORWARD on and the emitter count positive, or FORWARD not on and the emitter count negative, an indication is reached that the emitter counter has reached zero and it is necessary to turn the RUN off to allow the Forms Servo to start decelerating. Some of the work registers are cleared and a check made to see if forms had been running in high speed or whether High Speed is on.

Depending on whether High Speed is on or off, a High Speed Stop count is loaded or a Low Speed Stop count is loaded. This is the same count which had been removed from the counter when the entire forms operation had started. These are the number of emitters that it is expected the forms will travel during deceleration time. These counts are now restored to the Emitter counters. The selected count is loaded and a check made to see if FORWARD is on. The count either goes to a Subtract Stop count or Add Stop count block and this will result in the restoration counters to their proper value since during the RUN operation they have been offset to allow for this deceleration time. Now that the deceleration offset count has been removed from them, a zero will indicate that the forms are in their proper position. During RUN, the zero in the Emitter counters indicated that it was time to stop the forms. Now that the forms are stopped, made to the main program.

Another circumstance will be discussed in connection with FIGS. 15E and 15F. This is the case where the system did not miss an emitter, that is the emitter change was a + or −1 or a 0 but not a net change of 2.

When there was a net change of "0" or "1", a "1" is subtracted from the Missing Emitter Counter. In case the count is negative, it is cleared; if not negative, a check is made to see if there was a negative emitter change. An exit goes to FIG. 15I, input (A), previously described, back to input (A), FIG. 15F, a positive emitter. Both of these paths were already discussed on the missed emitter path for a change of 2. Here we are doing the same thing, only our change in position is a "1".

In summary, the control microprocessor issues the Forms command, goes to other program routines, and may not be able to check the emitters coming in. The control microprocessor also has to control the print head and the ribbons and the Head Image Generator and a few other things. This procedure helps it keep track of forms status at all times even though it cannot check continuously.

The microprocessor has no interrupt procedures and can only control elements in the system by sampling or looking at them periodically to see if there has been any change since the last time. Since the printer subsystem is running asynchronously with respect to the hardware, this missed emitter scheme and the table allows a bit of latitude in not having to remain exactly in synchronization with the hardware. It allows samples periodically while maintaining accuracy. Thus, the emitter detection arrangement described herein allows the printer control unit, particularly the control microprocessor, more flexibility and greatly decreases the possibility of making an error in determining the amount and direction of movement of an assembly, such as the forms feed assembly.

OPERATION CODES

A number of operation codes are utilized by the microprocessors. These are listed below.

| ALU OP CODES |
|---|
| - MODE VALUE - |
| REG TO REG 0__ |
| DAR TO DAR 1__ |
| REG TO DAR 2__ |
| DAR TO REG 3__ |

-continued

| | | |
|---|---|---|
| MSK TO REG 4 | | |
| MSK TO DAR 5 | | |
| Function OP Codes | | |
| Add | A | 0 |
| Add Carry | AC | 1 |
| Move | M | 2 |
| Clear (0) | CLR | 2 |
| Subtract/Borrow | SB | 3 |
| Subtract | S | 4 |
| Compare | C | 5 |
| Subtract Summary | SS | 6 |
| Compare Summary | CS | 7 |
| And | N | 8 |
| Set Bit Off | SBF | 8 |
| Test | T | 9 |
| And Summary | NS | A |
| Test Summary | TS | B |
| Or | O | C |
| Set Bit On | SBN | C |
| Shift Right | SR | D |
| Exclusive Or | X | E |
| Shift Right Circular | SCR | F |
| Conditional Branches | | |
| Branch Not Carry, Branch High | BNC,BH | C_ODD |
| Branch Carry, Branch Less Than Or Equal | BC,BLE | D_EVEN |
| Branch Not Zero, Branch Not Equal, Branch True | BNZ,BNE, BT | E_ODD |
| Branch Zero, Branch Equal, Branch False | BZ,BE, BF | F_EVEN |
| Unconditional Branches | | |
| Branch and Wait | BAW | C_EVEN |
| Branch | B | D_ODD |
| Branch and Link | BAL | E_EVEN |
| Branch Via Link | RTN | F001 |
| Return and Link | RAL | F201 |
| Branch Via DAR | BVD | F301 |
| Select Data Address Registers (DAR's) and Storage (STG) | | |
| Select Memory Data Low | SDL | FC01 |
| Select Memory Data High | SDH | FE01 |
| Select Memory Inst Low | SIL | F481 |
| Select Memory Inst High | SIH | F489 |
| Select Data Bit X Off | SXF | F441 |
| Select Data Bit X On | SXN | F445 |
| Select Main DARS | SMD | F501 |
| Select Aux DARS | SAD | F701 |
| Input/Output, Load/Store Ops | | |
| Input From Device | IN | 68 |
| Sense Device | SNS | 69 |
| Output To Device | OUT | 78 |
| Direct Input and Output | DIO | 7A |
| Load Registers | LDR | 89XY |
| Load Registers and DAR+1 | LDRP | 8BXY |
| Load DAR | LDD | 84XY |
| Load DAR and DAR+1 | LDDP | 86XY |
| Load Memory Indexed | LDI | 8A0 |
| Memory to I/O Device | MIO | 8C |
| Memory to I/O Device and DAR+1 | MIOP | 8E |
| Load Link Register | LDL | 8000 E |
| Load Link Register and DAR+1 | LDLP | 8200 E |
| Load Absolute Address | LDA | 9 |
| Store Registers | ST | A9XY |
| Store Registers and DAR+1 | STRP | ABXY |
| Store DAR | STD | A4XY |
| Store DAR and DAR+1 | STDP | A6XY |
| I/O Data To Memory | IOM | AC |
| I/O Data To Memory and DAR+1 | IOMP | AE |
| Store Memory Indexed | STI | AA0 |
| Store Link High Order (Even Byte) | SLH | A000 |
| Store Link High Order and DAR+1 | SLHP | A200 |
| Store Link Low Order (Odd Byte) | SLL | A100 |
| Store Link Low Order and DAR+1 | SLLP | A300 |
| Store In Absolute Address | STA | B |

MICROPROCESSOR REGISTERS

Each of the microprocessors 200 (200a) and 210 (210a) has a number of internal registers that are used for various purposes such as work registers. The register layout for the Control microprocessor 210 (210a) is shown in FIG. 16.

As a convenience, the register assignments are listed below.

| Communications Microprocessor Registers | | | |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Country Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0 = 1, 1 = 2) |
| RAMP | EQU | X'1' | Rest for Ramp Indicator |
| LSCON | EQU | D11 | Last Console Setting /F = In Load Mode |
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |
| D2LD | EQU | X'4' | Mask To Test for 2nd Data Load |
| D3LD | EQU | X'C' | Mask To Test 1st and 2nd Data Load |
| RESN1 | EQU | X'1' | Mask To Test for 1st Resend |
| RESN2 | EQU | X'2' | Mask To Test for 2nd Resend |

-continued

| | | | |
|---|---|---|---|
| RESND | EQU | X'3' | Mask To Test for Either Resend |
| NOLD | EQU | X'F' | Mask to Test for No Command |
| MVADJ | EQU | D15 | Adjustment Control Byte |
| RLRD1 | EQU | X'9' | Roll and Ready Indicator Together |
| ROLLD | EQU | X'8' | Roll Display Indicator |
| CHGD | EQU | X'4' | Change to Next Sequence Indicator |
| ADJP1 | EQU | X'2' | Change Density Mask |
| RDY1 | EQU | X'1' | Software Ready Indicator |
| RAMIN | EQU | X'OFFB' | End of Random Access Memory in ROS Slot |

Control Microprocessor Registers

| | | | |
|---|---|---|---|
| I00 | EQU | R0 | Input/Output Register |
| I01 | EQU | R1 | Input/Output Register |
| | | R2 | Work Register |
| | | R3 | Work Register |
| | | R4 | Work Register |
| PEMT | EQU | R5 | Indicates Previous Emitters |
| PHF | EQU | R6 | Print Head Flags |
| FRMST | EQU | X'1' | Forms Start Flag |
| DNSCH | EQU | X'2' | Density Change Flag |
| PARK | EQU | X'4' | Ramp Command Flag |
| PRCMP | EQU | X'8' | Printing is Complete |
| FLG1 | EQU | R7 | Indicator Flags |
| CD15 | EQU | X'1' | Character Density Equals 15 CPI |
| RV | EQU | X'2' | Print Head is Going Left (Reverse) |
| TXBUF | EQU | X'4' | Head Images Generator Is to Use Text Buffer 2 |
| HIGST | EQU | X'8' | Head Image Generator Is to Start Print Lines |
| FLG2 | EQU | R8 | Ribbon Flags |
| FBFLG | EQU | X'1' | Wire Feedback Flag |
| RBMON | EQU | X'2' | Ribbon Motor Is On |
| FMSTM | EQU | X'4' | Forms Time Flag |
| TOK | EQU | X'8' | Turn Around is OK |
| WIPOS | EQU | R9 | Wire Position Counter |
| FECT | EQU | R10 | False Emitter Counter |
| DIAGF | EQU | X'1' | Diagnostic Flag |
| FDRCT | EQU | X'2' | Direction of Forms Movement |
| FE2 | EQU | X'4' | False Emitter 2 |
| FE1 | EQU | X'8' | False Emitter 1 |
| PRERR | EQU | R11 | Printer Error Flags |
| | EQU | X'8' | Not Used |
| HHOME | EQU | X'4' | Head Home Flag |
| TEDGE | EQU | X'2' | Turnaround Edge Flag |
| HATNA | EQU | X'1' | Head Stopped At Turnaround Flag |
| CMDFL | EQU | R12 | Command Flags |
| PRCMD | EQU | X'1' | Print Command Flag |
| PRPND | EQU | X'2' | Print Command Is Pending |
| FMCMD | EQU | X'4' | Forms Command Flag |
| TSCMD | EQU | X'8' | Test Command Flag |
| EMCT1 | EQU | R13 | Emitter Counters - Used to Determine |
| EMCT2 | EQU | R14 | Head Position by |
| EMCT3 | EQU | R15 | the Number of Emitters From Left Margin |
| MAIN/AUX | EQU | D0,D0 Aux | Address Registers |
| MAIN/AUX | EQU | D1,D1 Aux | Address Registers |
| MAIN/AUX | EQU | D2,D2 Aux | Address Registers |
| RM1 | EQU | D3 | Indicates Right Margin |
| RM2 | EQU | D4 | When the Emitter |
| RM3 | EQU | D5 | Counter Attains This Value |

End of Forms Indicators

| | | | |
|---|---|---|---|
| EOFI | EQU | D6 | End of Forms Indicators |
| LASTD | EQU | X'8' | Last Forms Direction, 1 = Forward; 0 = Reverse |
| LBUSY | EQU | X'4' | Busy History Indicator |
| FBSEQ | EQU | X'2' | Busy Sequence Flag |
| EOFER | EQU | X'1' | End of Forms Detected Indicator |
| FMCT1 | EQU | D7 | 16 Bit Forms AB Emitter Counter |
| FMCT2 | EQU | D8 | |
| FMCT3 | EQU | D9 | |
| FMCT4 | EQU | D10 | |
| SIGN | EQU | X'8' | Counter Sign Bit |

Emitter Status Register

| | | | |
|---|---|---|---|
| ESTAT | EQU | D11 | |
| LASTE | EQU | X'4' | Last End-of-Forms Emitter Value |
| LASTA | EQU | X'2' | Last Forms A Emitter Value |
| LASTB | EQU | X'1' | Last Forms B Emitter Value |
| | EQU | D12 | |
| FLECT | EQU | D13 | Forms Lost Emitter Counter |
| FMECT | EQU | D14 | Forms Missing Emitter Counter |
| PT1 | EQU | D15 | Program Timer 1/Forms Command Count |
| FLAST | EQU | X'8' | 8 or More Forms Commands Flag |

EQUATES—CONTROL MICROPROCESSOR

The following equivalent expressions, that is, "equates" are used in connection with Control microprocessor program listings. These are used by an Assembler to fill in a number for the English-type expression.

| Name | Definition |
|---|---|
| DTNT | Forms Detent Speed |
| EOFC | End of Forms Counter |
| EOFEM | End of Forms Emitter |
| EOFER | End of Forms Detected Indicator |
| ERROR | Error Bit |
| FAB | Forms A/B Emitter Mask |
| FBUSY | Forms Busy |
| FCT1 | Next Forms Command |
| FCT2 | |
| FDET | Forms Forward Detent Command |
| FEA | Forms Emitter A |
| FEB | Forms Emitter B |
| FMCMD | Forms Command Flag |
| FRM10 | Forms I/O |
| FRMST | Forms Start Flag |
| FWD | Forms Direction |
| HISPD | Forms High Speed |
| HSIND | Forms In High Speed Indicator |
| LASTD | Last Forms Direction, 1 = FWD, 0 = REV |
| LBUSY | Busy History Indicator |
| MARGN | (In R0) Margin Emitter |
| NOFEM | No Forms Emitter Counter |
| PREM | (In R0 Print Emitter |
| RDET | Forma Reverse Detent Command |
| RUN | Forms Run |
| SIGN | Counter Sign Bit |
| STOP | Forms Stop Command |
| TRNAR | (In R0) Turn Around Emitter |

LABELS—CONTROL MICROPROCESSOR

The following labels are used by the Control microprocessor. These serve, for example, as pointers for addressing or for branching purposes.

| Label | Label | Label |
|---|---|---|
| ACT | FREV | SCT |
| ADDCT | FRUNS | SF |
| ASC | FSTRT | SFCT |
| EOFCZ | FTST | SPDT |
| EOFDA | FZT | STDET |
| EOFDB | HSSTP | STRTF |
| EXITX | HSTPA | STRT1 |

| Label | Label | Label |
|---|---|---|
| FBACK | HSTPB | TESTZ |
| FCOMD | HSTRA | TFS |
| FD | HSTRB | TNE |
| FEC | LSPD | TZ |
| FFWD | LSTPA | WASIS |
| FMRON | LSTPB | ZH1 |
| FMRVS | LSTRA | ZNEC |
| FORCTL | LSTRB | ZW |
| FORER | NEGEM | |

PROGRAM LISTINGS

Program listings (source statements) that relate to the flow charts and routines described herein are presented below:

FORMS CONTROL ROUTINE

This Routine

1. Detects changes in the end-of-forms emitter and detects end of forms.
2. Counts the forms AB emitter and increments or decrements the forms emitter counter.
3. Stops the forms servo motor at the required distance from the destination and sets the op-complete flag.
4. Initiates and stops forms detent motion as required.
5. Clears the forms command flag when forms busy goes off.
6. Detects the absence of forms emitters when the forms are running.
7. Detects excess missed emitters.
8. Detects motor running in wrong direction.

| | FORMS CONTROL DATA/CONSTANTS | | |
|---|---|---|---|
| Label | Op Code | Arguments | Comment |
| LSTRA | EQU | X'1' | LOW SPEED START - /18 (24) |
| LSTRB | EQU | X'8' | |
| LSTPA | EQU | X'1' | LOW SPEED STOP - /10 (16) |
| LSTPB | EQU | X'0' | |
| HSTRA | EQU | X'7' | HI SPEED START - LOW SPEED START /78 (120) |
| HSTPA | EQU | X'2' | HI SPEED STOP /30 (48) |
| HSTPB | EQU | X'C; | |
| EOFDA | EQU | X'5' | EOF DETECT COUNT /50 (80) |
| EOFDB | EQU | X'0' | |
| FORMS | IN | FRMTO | READ FORMS EMITTERS |
| | M | FSTAT,FSTSV | SAVE FORMS STATUS |
| | IN | FLATCH | READ SERVO STATUS |
| | M | FMCTL,FCTSV | SAVE FORMS CONTROL |

| | TEST FOR EOF EMITTER CHANGE | | |
|---|---|---|---|
| Label | Op Code | Arguments | Comment |
| | M | FSTSV,W1 | MOVE EMITTER VALUES TO WORK REG. |
| | X | ESTAT,W1 | X-OR LAST EMITTER VALUE |
| | T | EOFEM,W1 | TEST FOR CHANGE |
| | BF | FEC | GO TO COUNT ROUTINE IF NO CHANGE |
| | M | EOFDA,EOFC1 | RESET EOF COUNTER |
| | M | EOFDB,EOFC2 | TO INITIAL VALUE |
| | OUT | EOFC | AND STORE IN REGISTER STACK |

| | FORMS AB EMITTER COUNTER | | |
|---|---|---|---|
| Label | Op Code | Arguments | Comments |
| FEC | M | WASIS,D0,2 | LOAD DARS WITH HI ORDER |
| | M | WASIS,D1,3 | WAS/IS TABLE ADDRESS |
| | M | ESTAT,D2 | MOVE PREVIOUS AB TO LO ORDER DAR |
| | M | FSTSV,ESTAT | SAVE PRESENT EMITTER STATUS |
| | A | D2,D2 | SHIFT LEFT |
| | A | D2,D2 | TWO PLACES |
| | M | FSTSV,W1 | MOVE PRESENT EMITTERS TO WORK REG |
| | N | FAB,W1 | TURN OFF OTHER BITS |
| | O | W1,D2 | OR INTO LO ORDER DAR |
| | LDD | W3,W4 | LOAD TABLE ENTRY FROM WASIS |
| | BNZ | ZNEC | CLEAR NO EMITTER CIR IF CHANGE |
| | B | ZW | ELSE CONTINUE |
| ZNEC | M | 0,NOEM1 | CLEAR NO EMITTER |
| | M | 0,NOEM2 | COUNTER |
| | OUT | NOFEM | AND STORE IN EXT REG |
| ZW | M | 0,W1 | CLEAR HI ORDER |
| | M | 0,W2 | WORK REGISTERS |
| | T | 2,W4 | TEST FOR MISSED EMITTER |
| | BF | TNE | BRANCH IF NONE MISSED |
| STEP MISSED EMITTER COUNTER BY 3 | | | |

-continued

| Label | Op Code | Arguments | Comment |
|---|---|---|---|
| | A | 3,FMECT | ADD 3 TO MISSED EMITTER COUNTER |
| | BC | FER03 | ERROR IF CARRY |
| | T | FDRCT,FECT | TEST IF IN FORWARD DIRECTION |
| | BF | NEGEM | ASSUME NEGATIVE IF NOT FWD |
| | B | ADDCT | ELSE ASSUME A POSITIVE EMITTER |

EMITTER NOT MISSED, DECREMENT MISSED EMITTER COUNTER

| Label | Op Code | Arguments | Comment |
|---|---|---|---|
| TNE | S | 1,FMECT | SUBTRACT ONE FROM COUNTER |
| | BC | TNE1 | CONTINUE IF NOT STEPPED PAST ZERO |
| | M | 0,FMECT | RESET COUNT TO ZERO |
| TNE1 | T | 8,W3 | TEST FOR NEGATIVE DIRECTION |
| | BT | NEGEM | BRANCH IF NEGATIVE |
| ADDCT | BAL | ACT | GO ADD TO EMITTER COUNTER |

END OF FORMS DETECT ROUTINE, POSITIVE EMITTER CHANGE

| Label | Op Code | Arguments | Comment |
|---|---|---|---|
| | IN | EOFC | GET END OF FORMS COUNTER |
| | T | LASTD,EOFI | TEST OF FWD FORMS MOTION |
| | BT | FREV | BRANCH IF REVERSE |

STEP LOST EMITTER COUNTER DOWN MOVED IN RIGHT DIRECTION

| Label | Op Code | Arguments | Comment |
|---|---|---|---|
| FFWD | S | W4,FLECT | SUBTRACT 1 FROM COUNT |
| | BC | FFWD1 | AND CONTINUE IF COUNT GE 0 |
| | M | 0,FLECT | RESET TO ZERO |
| FFWD1 | S | W4,EOFC2 | SUBTRACT EMITTER CHANGE FROM EOF |
| | SB | 0,EOFC1 | COUNTER |
| | BNC | EOFCZ | BRANCH IF EOF CIR GOES TO ZERO |
| | OUT | EOFC | STORE EOF COUNT |
| | B | TESTZ | ELSE CONTINUE |
| FREV | A | W4,WOFC2 | ADD EMITTER CHANGE TO |
| | AC | 0,EOFC1 | EOF COUNTER |
| | BC | FER04 | ERROR IF CARRY, WRONG DIRECTION |
| | A | W4,W4 | STEP LOST EMITTER COUNTER |
| | A | W4,W4 | |
| | A | W4,FLECT | |
| | BC | FER06 | ERROR IF CARRY |
| | OUT | EOFC | AND STORE IN EXT REG |

TEST IF FORMS ARE IN RUN

| Label | Op Code | Arguments | Comment |
|---|---|---|---|
| TESTZ | T | RUN,FCTSV | TEST IF FORMS IN RUN STATUS |
| | BT | FRUNS | IF SO BRANCH TO RUN STATUS ROUTINE |

TEST IF BUSY JUST WENT OFF

| Label | Op Code | Arguments | Comment |
|---|---|---|---|
| | T | FBUSY,FSTSV | ARE FORMS BUSY |
| | BT | EXITX | IF YES, RETURN |
| | T | FBSEQ,EOFI | NO, WERE FORMS BUSY |
| | BT | FER05 | NO, ERROR IF NOT |
| | T | LBUSY,EOFI | WERE FORMS BUSY LAST TIME |
| | BF | FZT | IF NOT, CONTINUE |

TRANSITION FROM BUSY TO NOT BUSY JUST OCCURRED

| Label | Op Code | Arguments | Comment |
|---|---|---|---|
| | SBF | FMCMD,CMDFL | CLEAR FORM COMMAND FLAG |
| | SBF | LBUSY,EOFI | CLEAR BUSY HISTORY INDICATOR |

TEST EMITTER COUNTER FOR ZERO

| Label | Op Code | Arguments | Comment |
|---|---|---|---|
| HIX55 | EQU | | HEX CONSTANT X'55' |
| FZT | C | 0,FMCT1 | TEST FOR |

|       | CS  | 0,FMCT2 | ZERO IN |
|-------|-----|---------|---------|
|       | CS  | 0,FMCT3 | EMITTER |
|       | CS  | 0,FMCT4 | COUNTER |
|       | BNE | DTENT   | BRANCH IF NOT ZERO |
|       | B   | STDET   | GO TO STOP/DETENT ROUTINE |

NEGATIVE EMITTER CHANGE

| Label | Op Code | Arguments | Comment |
|-------|---------|-----------|---------|
| NEGEM | M   | 0,W3 | NEGATIVE, CLEAR WORK REG |
| SUBCT | BAL | SCT  | GO SUBTRACT FROM COUNTER |

END OF FORMS DETECT ROUTINE, NEGATIVE EMITTER CHANGE

| Label | Op Code | Arguments | Comment |
|-------|---------|-----------|---------|
|       | IN | EOFC         | GET END OF FORMS COUNTER |
|       | T  | LASTD,EOFI   | TEST IF FORWARD MOTION |
|       | BF | FREV         | ADD COUNT IF FWD |
|       | B  | FFWD         | SUBTRACT IF REVERSE |

END OF FORMS DETECTED - SET DETECT BITS

| Label | Op Code | Arguments | Comment |
|-------|---------|-----------|---------|
| EOFCZ | SBN | EOFER,EOFI  | SET DETECT BIT |
|       | M   | EOFDA,EOFC1 | RESET EOF COUNTER |
|       | M   | EOFDB,EOFC2 | TO INITIAL VALUE |
|       | OUT | EOFC        | AND OUTPUT TO EXT REG |
|       | B   | TESTZ       | AND TEST FOR ZERO |

FORMS STOP/DETENT CONTROL

| Label | Op Code | Arguments | Comment |
|-------|---------|-----------|---------|
| STDET | M   | STOP,FMCTL  | PUT STOP COMMAND IN OUTPUT REG |
| FCOMD | OUT | FRMIO       | OUTPUT COMMAND TO FORMS SERVO |
|       | OUT | FLATCH      | SAVE IN REGISTER STACK |
|       | RTN |             | RETURN |
| DTENT | M   | 0,FLECT     | CLEAR LOST EMITTER COUNTER |
|       | T   | SIGN,FMCT1  | TEST COUNT SIGN |
|       | BT  | FD          | BRANCH IF NEGATIVE COUNT |
|       | M   | RDET,FMCTL  | SET REVERSE DETENT |
|       | SBF | FDRCT,FECT  | CLEAR FORWARD DIRECTION INDICATOR |
|       | B   | FCOMD       | TO SEND COMMAND |
| FD    | M   | FDET,FMCTL  | SET FORWARD DETENT |
|       | SBM | FDRCT,FECT  | SET FORWARD DIRECTION INDICATOR |
|       | B   | FCOMD       | GO SEND COMMAND |
| EXITX | IN  | FBCIR       | STEP FORMS BUSY COUNTER |
|       | A   | 1,IO1       |  |
|       | AC  | 0,IO0       |  |
|       | BC  | FER07       | ERROR, BUSY TOO LONG |
|       | OUT | FBCIR       | SAVE COUNT |
|       | SBN | LBUSY,EOFI  | SET BUSY HISTORY INDICATOR |
|       | SBF | FBSEQ,EOFI  | CLEAR BUSY SEQUENCE FLAG |
|       | RTN |             | RETURN TO CALLER |

FORMS IN RUN STATUS

| Label | Op Code | Arguments | Comment |
|-------|---------|-----------|---------|
| FRUNS | LDA | #CLR       | CLEAR BUSY COUNTER |
|       | OUT | FBCTR      |  |
|       | IN  | NOFEM      | GET NO EMITTER COUNT FROM EXT REG |
|       | A   | 1,NOEM2    | INCREMENT NO EMITTER COUNTER |
|       | AC  | 0,NOEM1    |  |
|       | OUT | NOFEM      | RESTORE NO EMITTER COUNT |
|       | BNC | TZ         | CONTINUE IF NO CARRY OUT |
|       | M   | STOP,FMCTL | STOP FORMS, NO EMITTERS |
|       | OUT | FRMI0      |  |
|       | OUT | FLATCH     | SAVE IN REGISTER |
|       | B   | FER01      | FORMS ERROR, BRANCH TO ERROR ROUTINE NO EMITTERS WITH RUN ON |

TEST IF FORMS MOTOR SHOULD BE STOPPED

| Label | Op code | Arguments | Comment |
|-------|---------|-----------|---------|
| TZ    | T | FWD,FCTSV | TEST IF IN FORWARD RUN |

-continued

| Label | Op Code | Arguments | Comment |
|---|---|---|---|
| | BT | TFS | BRANCH IF FWD |
| | T | SIGN,FMCT1 | REVERSE RUN, TEST COUNTER SIGN BIT |
| | BT | SPDT | BRANCH TO STOP FORMS IF COUNT MINUS |
| | RTN | | RETURN IF STILL POSITIVE |
| TFS | T | SIGN,FMCT1 | FORWARD RUN, TEST IF COUNT POSITIVE |
| | BT | RTN | RETURN IF STILL NEGATIVE |

STOP FORMS AND RESTORE DECELERATION EMITTER COUNT

| Label | Op Code | Arguments | Comment |
|---|---|---|---|
| SPDT | M | 0,W1 | CLEAR HI ORDER |
| | M | 0,W2 | WORK REGS |
| | T | HISPD,FCTSV | ARE FORMS IN HI SPEED |
| | BT | HSSTP | IF YES GO TO HI SPEED STOP |
| | M | LSTPA,W3 | LOAD LO SPEED STOP COUNT |
| | M | LSTPB,W4 | IN WORK REGS |
| | B | FTST | GO TO DIRECTION TEST |
| HSSTP | M | HSTPA,W3 | MOVE HI SPEED STOP COUNT |
| | M | HSTPB,W4 | TO WORK REGS |
| FTST | T | FWD,FCTSV | TEST IF FORWARD |
| | BT | SFCT | BRANCH IF FORWARD |
| | BAL | ACT | GO ADD STOP COUNT TO EMITTER COUNTER |
| | B | SF | GO STOP FORMS |
| SFCT | BAL | SCT | SUBTRACT STOP COUNT FROM COUNTER |
| SF | M | FCTSV,FMCTL | LOAD STOP COMMAND |
| | SBF | RUN,FMCTL | TURN OFF RUN |
| | OUT | FRMIO | OUTPUT COMMAND |
| | OUT | FLATCH | AND SAVE IN I/O STACK |
| | RTN | | AND RETURN |

FORMS AB EMITTERS WAS/IS TABLE

| Label | Op Code | Arguments | Comment |
|---|---|---|---|
| | BORG | 16 | |
| WASIS | DC | A(X'0081',X'0102',X'0100',X'0281') | |
| | DC | A(X'8102',X'0001',X'0201',X'8100') | |

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

We claim:

1. An arrangement for detecting signals occurring during the operation of a printer system including a microcontroller, said arrangement comprising:

at least one assembly movable during operation of said system responsive to signals supplied to it;

means providing signals to said assembly indicative of both extent and direction of movement required;

means operable during initiation and normal movement of said moving assembly to provide emitter signals indicative of the extent of movement of said assembly;

means in said microcontroller for initiating movement of said assembly, said microcontroller returning to other routines after such initiation but periodically checking the condition of said moving assembly;

storage means associated with said microcontroller for storing a table indicative of the relationship between emitter conditions during movement of said assembly at a previous state of movement and at a current state of movement, said table providing an indication of the extent and direction of movement of said moving assembly; and means in said microcontroller for sensing emitter signals periodically during operation of said moving assembly, for comparing said signals against the signals previously stored, and for determining that signals were missed or were not missed during any interval from a previous set of emitter signals to the current set of emitter signals presently being checked.

2. The emitter detection arrangement of claim 1, further comprising:

a forms feed assembly in said system, said forms feed assembly having an emitter assembly that provides signals to indicate movement of said forms feed assembly relative to a print line in said printer system.

3. The arrangement of claim 1, further comprising:

a reference data table in said storage means, said data table providing information signals based on previous emitter inputs and present emitter inputs as to the extent of forward or reverse motion of said moving assembly.

4. The arrangement of claim 3, further comprising:

data stored in said table indicative of emitter signals occurring during forward or reverse movement of said moving assembly.

5. The arrangement of claim 4, wherein said emitter signals are provided from a matrix array related to the maximum amount of time represented in the emitter cycles that the controller requires to periodically check the status of said moving assembly.

6. The arrangement of claim 1, wherein said storage means has tables for storing emitter signals, one table storing emitter signals occurring in a forward direction of movement of said moving assembly and the other table storing emitter signals indicative of a reverse direction of movement of said moving assembly.

7. The arrangement of claim 1, further comprising:
a data table in said storage means, said data table storing emitter count representations that indicate the extent of forward and reverse movement of said moving assembly during an operation, and said data table further storing stop count representations that indicate how far said assembly will coast after being instructed to stop;
means in said system for loading and counting emitter signals representative of timing intervals encountered during normal run speed, low speed, and high speed operating conditions of said moving assembly; and
means in said micontroller for utilizing said emitter signals and stop count representations to insure accurate maintenance of the emitter status of said moving assembly during its operation.

8. The arrangement of claim 1, further comprising:
means in said microcontroller responsive to occurrence of missing emitter signals greater than a preselected maximum number permissible during operations to provide an error indication.

9. The arrangement of claim 1, further comprising:
adjustment means in said microcontroller operable when said moving assembly has reached the destination required during its operation to initiate a series of commands and monitor operation of said moving assembly in order to locate it precisely at the required position.

10. The system of claim 1, further comprising:
stop/jam means in said microcontroller for detecting the non-occurrence of emitter signals from said movable assembly after a command is issued to said assembly to provide an error indication indicating that the assembly has not in fact moved or that a jam has occurred.

11. The system of claim 1, further comprising:
a forms feed assembly in said system, a print assembly, and a ribbon drive assembly, the several assemblies being arranged to provide movement for forms and printing on said forms under control of said microcontroller during operations of said system.

12. An arrangement for detecting signals occurring during the operation of a printer system including a microcontroller, said arrangement comprising:
at least one assembly movable during operation of said system responsive to signals supplied to it;
means providing signals to said assembly at least indicative of movement required;
means operable during initiation and normal movement of said moving assembly to provide movement signals indicative of the extent of movement of said assembly;
means in said microcontroller for initiating movement of said assembly, said microcontroller returning to other routines after such initiation but periodically checking the condition of said moving assembly;
storage means associated with said microcontroller for storing signals indicative of the relationship between emitter conditions during movement of said assembly at a previous state of movement and at a current state of movement, said signals providing an indication of the extent of movement of said moving assembly; and
means in said microcontroller for sensing emitter signals periodically during operation of said moving assembly, for comparing said signals against the signals previously stored, and for determining that signals were missed or were not missed during any interval from a previous set of movement signals to the current set of movement signals presently being checked.

* * * * *